(12) United States Patent
Grechanik et al.

(10) Patent No.: US 8,122,444 B2
(45) Date of Patent: Feb. 21, 2012

(54) LEGACY APPLICATION DECOMMISSIONING FRAMEWORK

(75) Inventors: Mark Grechanik, Chicago, IL (US); Kevin Michael Conroy, Rockville, MD (US)

(73) Assignee: Accenture Global Services Limited, Dublin (IE)

( * ) Notice: Subject to any disclaimer, the term of this patent is extended or adjusted under 35 U.S.C. 154(b) by 1237 days.

(21) Appl. No.: 11/888,970

(22) Filed: Aug. 2, 2007

(65) Prior Publication Data

US 2009/0037896 A1 Feb. 5, 2009

(51) Int. Cl.
*G06F 9/44* (2006.01)
*G06F 15/173* (2006.01)

(52) U.S. Cl. ......... 717/168; 717/169; 717/171; 709/223

(58) Field of Classification Search .................. None
See application file for complete search history.

(56) References Cited

U.S. PATENT DOCUMENTS

| | | | | |
|---|---|---|---|---|
| 5,359,730 | A * | 10/1994 | Marron | 717/169 |
| 5,920,725 | A * | 7/1999 | Ma et al. | 717/171 |
| 5,960,189 | A * | 9/1999 | Stupek et al. | 717/169 |
| 6,199,203 | B1 * | 3/2001 | Saboff | 717/168 |
| 6,651,249 | B2 * | 11/2003 | Waldin et al. | 717/170 |
| 6,745,382 | B1 * | 6/2004 | Zothner | 717/107 |
| 7,000,228 | B2 * | 2/2006 | Mortazavi | 717/168 |
| 7,246,350 | B2 * | 7/2007 | Vu | 717/171 |
| 7,293,253 | B1 * | 11/2007 | Soukup | 717/108 |
| 7,818,736 | B2 * | 10/2010 | Appavoo et al. | 717/168 |
| 2003/0033369 | A1 * | 2/2003 | Bernhard | 709/203 |
| 2004/0148184 | A1 * | 7/2004 | Sadiq | 705/1 |
| 2005/0268165 | A1 * | 12/2005 | Betts et al. | 714/18 |
| 2006/0041862 | A1 | 2/2006 | Moussallam et al. | |
| 2006/0129516 | A1 * | 6/2006 | Bradford et al. | 707/1 |
| 2006/0156296 | A1 * | 7/2006 | Goldberg | 717/168 |
| 2006/0173987 | A1 * | 8/2006 | Friesen et al. | 709/223 |
| 2006/0206599 | A1 | 9/2006 | Milligan et al. | |
| 2006/0277537 | A1 * | 12/2006 | Chan et al. | 717/168 |
| 2007/0005739 | A1 * | 1/2007 | Carey et al. | 709/223 |

OTHER PUBLICATIONS

Shen, J., et al. "Towards a Unified Formal Model for Supporting Mechanisms of Dynamic Component Update." Proceedings of the 10th European Software Engineering Conference [online], 2005 [retrieved Oct. 18, 2011]. Retrieved from Internet: <http://www.cs.ubbcluj.ro/~amarcus/cbpf04/papers/Shen05.pdf>, pp. 80-89.*

Liu, Y., et al. "Qos Computation and Policing in Dynamic Web Service Selection." Proceedings of the 13$^{th}$ International Work Wide Web Conference [online], 2004 [Retrieved Oct. 10, 2011]. Retrieved from Internet: <http://citeseerx.ist.psu.edu/viewdoc/download-?doi=10.1.1.2.1739&rep=rep1&type=pdf>, pp. 66-73.*

(Continued)

*Primary Examiner* — Thuy Dao
*Assistant Examiner* — Todd Aguilera
(74) *Attorney, Agent, or Firm* — Fish & Richardson P.C.

(57) ABSTRACT

A legacy application decommissioner provides developers a tool to decommission and migrate legacy application functionality in a phased approach. The decommissioner identifies core web services that invoke legacy applications through an accessibility layer that monitors operator interaction with the application. The decommissioner then defines, creates, and deploys a web service that provides control over the operation of the legacy application. As a result, the functionality of the legacy application may be migrated to a new platform and architecture and the legacy application decommissioned so that organizations may continue to realize a return on their significant investment in the creation of the legacy application.

20 Claims, 22 Drawing Sheets

OTHER PUBLICATIONS

Canfora, G., et al. "Migrating Legacy Systems to Web Services." Proceedubgs if the 10th European Conference on Software Maintenance and Engineering [online], 2006 [retrieved Oct. 10, 2011]. Retrieved from Internet: <http://ieeexplore.ieee.org/stamp/stamp.jsp?tp=&arnumber=1602355>, pp. 1-10.*

Grechanik et al, "Integrating and Reusing GUI-Driven Applications", International Conference on Software Reuse (ICSR-7, LNCS 2319), pp. 1-16, 2002.

Canadian Office Action for Application No. 2,636,516 dated Jan. 18, 2011, 4 pages.

Grechanik et al., "Creating Web Services from GUI-Based Applications", Accenture Technology Labs, Chicago, Illinois, eight pages, Aug. 2006.

European Search Report issued in European Application No. EP 08 25 2627, mailed Jun. 8, 2010, 8 pages.

Carzaniga, A. et al., "A Characterization Framework for Software Deployment Technologies," Technical Report CU-CS-857-98, Apr. 1, 1998, XP007900839.

Grechanik, M. et al., "Composing Integrated Systems Using GUI-based Applications and Web Services," Services Computing, 2007. SCC 2007, IEEE International Conference ON, IEEE, Piscataway, NJ, Jan. 1, 2007, pp. 68-75, XP002493633.

Kang-Won Lee et al., "Deployment Time Optimization of Distributed Applications," Internet Citation, Nov. 2006, XP002429930, Retrieved from the Internet: URL :http://www.research.ibm.com/people/k/kangwon/publications/deplyment_time_optimization.pdf> [retrieved on Apr. 18, 2007].

Lizhou Yu et al., "A Framework for Live Software Upgrade," Software Reliability Engineering, 2002. Proceedings. 13th International Symposium on Nov. 12-15, 2002, Piscataway, NJ, IEEE, Nov. 12, 2002, pp. 149-158, XP010625133, ISBN: 978-0/7695-1763-6.

* cited by examiner

US 8,122,444 B2

LEGACY APPLICATION DECOMMISSIONING FRAMEWORK

BACKGROUND OF THE INVENTION

1. Technical Field

This disclosure concerns a system and method for decommissioning legacy applications by migrating functionality of legacy applications to new platforms and architectures. In particular, this disclosure relates to an efficient and non-invasive way to decommission legacy applications using a phased migration approach.

2. Background Information

A strong demand exists for a system and method to decommission legacy applications in the course of migrating legacy applications to new platforms and architectures. When an organization initiates the decommissioning of a legacy application by migrating functionality to a new platform or architecture, organizations spend a great deal of time and money recreating the functionality of legacy applications from scratch. Often, system integrators desire to reuse existing assets of a legacy application targeted for decommissioning (e.g., legacy applications, processes, and software components) by simply providing a new interface or platform in which to interact with these assets. One such example includes migrating legacy applications to web services in a Service Oriented Architecture (SOA). Unfortunately, developers have identified only a limited number of ways to migrate legacy applications to new platforms and architectures without giving rise to lengthy project schedules and excessive budgets, often forcing companies to reengineer systems and applications from scratch.

Developers often use legacy application migration approaches that do not allow for the phased migration of functionality. Migration approaches that impose a non-phased approach take longer to complete, increase the complexity of testing, and impose a burden on users to adapt to an entire suite of migrated functionality all at once. Even phased migration approaches can be plagued with inefficiencies. For example, one phased migration approach actually expose users to two disparate systems (e.g., the legacy application and the new migration) during the migration until developers complete the entire migration, and force users to interact with the two disparate systems through separate interfaces.

Legacy applications often incorporate Graphical User Interface (GUI) APplications (GAPs) implemented in a closed and monolithic manner. System integrators find migrating existing GAPs a particularly difficult technical challenge, especially for closed and monolithic GAPs because GAPs do not interoperate (e.g., exchange information) with other systems. Because closed and monolithic GAPs do not interoperate with other systems, phased migrations present extremely technical challenges. Given the complexity of GAPs and the cost to efficiently and non-invasively make GAPs interoperable, presents one of the fundamental technical problems of migrating legacy applications.

While newer technology such as web services can provide flexible functionality, organizations have invested heavily in legacy GAPs that developers consider difficult to add to an existing framework of web services and modify to enable interoperability, because of brittle legacy architectures, poor documentation, significant programming effort, and subsequently, the large cost of such projects. Great difficulties and enormous expenses associated with migrating legacy applications into integrated (interoperable) applications exist. Beyond migrating legacy applications into integrated applications components, system integrators and applications programmers must define protocols and implement functionality required to enable information exchanges between the components of integrated applications, which may include GAPs and web services.

Organizations tend to use legacy GAPs as long as possible in business operations, primarily to realize the return on investment for the legacy GAPs. However, system integrators consider the vast majority of GAPs encountered as closed and monolithic and prefer to use legacy GAPs as long as possible to avoid the burden of re-writing the functionality from scratch because of the difficulty of enabling GAPs to interoperate. Most GAPs do not expose programming interfaces or data in known formats. Thus, while system integrators desire to incrementally migrate GAPs components into integrated applications, often the original implementation of a GAP makes migration without re-writing logic impossible.

Further exacerbating the problem is that organizations often do not have access to the source code of third-party GAPs, which prevents organizations from migrating third-party GAPs to new platforms and architectures. In such instances, developers must locate old and often inaccurate requirements documents, observe the third-party GAPs during user sessions and write functionality from scratch. The inability to review legacy source code forces developers to employ extensive testing, but does not ensure that all the developer has captured all the third-party GAPs functionality correctly.

The extraordinary technical challenges associated with decommissioning a legacy application and migrating legacy applications to new platforms and architectures include implementing controlled phased migrations that allow organizations to introduce migrated functionality in manageable portions over time. The technical challenges also include decommissioning and migrating third-party GAPs without the ability to review the legacy source code of the third-party GAPs.

A need has long existed for a system and method that migrates legacy applications to new platforms and architectures in a phased migration approach efficiently and non-invasively.

SUMMARY

Migrating legacy GAPs to new platforms and architectures allow organizations to improve their business processes and extend the usability of legacy GAP functionality. The legacy application decommissioning framework (Decommissioner) provides developers a way to implement phased migrations of legacy applications to new platforms and architectures. The decommissioner allows organizations to control the migration of legacy applications at a granular level by providing a web service wrapper for GAPs (e.g., functionality of an interoperable legacy application) that allows a developer to incrementally decommission the legacy application. The decommissioner builds a core web service that includes a core web service identifier and legacy application invocation logic that interacts with the legacy application and invokes the legacy application logic. The decommissioner produces a web service wrapper that includes the core web service identifier and legacy application invocation logic (e.g., a call to a proxy or a dispatcher). The decommissioner uses the dispatcher as a central point for coordinating proxies in a distributed environment. The proxy registers with the dispatcher under a unique name, collects GAP identification data and information about GAPs, and sends the collected GAP identification and information about GAPs to the dispatcher. The dispatcher uses the information collected from the proxies to route web service requests. The dispatcher acts as a request handler and receives a web service functionality request for legacy application logic and responsively invokes the decommissioning framework. The developer may introduce decommissioning replacement logic into the web service wrapper to allow a user to interact with the legacy application and new application transparently using a common interface (e.g., a client program). The decommissioning replacement logic maps legacy application features into the web service wrapper that the decommissioner can eventually decommission in the legacy application. The decommissioner tracks the legacy application logic (e.g., features) implemented in the web service wrapper and notifies the developer when the features identified for decommissioning have been replaced and/or decommissioned in the legacy application.

The decommissioner may incrementally introduce decommissioning replacement logic into the web service wrapper over a transition period during which the developer incrementally migrates the legacy application functionality to the new application so that the legacy application can be completely decommissioned at the end of the transition period. The organization may vary the transition period for each of the discrete features (e.g., legacy application logic implementing particular functionality) of the legacy application depending on the complexity of the legacy application logic providing the functionality, the migration dependencies and impacts to other legacy application features, and the readiness of the new application to inherit the decommissioned functionality from the legacy application.

The decommissioner can replace legacy application logic with decommissioning replacement logic at a very granular level. For example, the decommissioner may provide zero degrees of coverage for the legacy application logic implementing a particular feature. The decommissioner may provide a non-zero degree of coverage so that a blended combination of legacy application logic and decommissioning replacement logic provide the features of the legacy application. The decommissioner may provide 100 percent decommissioning replacement logic (e.g., 100% degree of coverage) where the decommissioner has completely migrated the legacy application logic to a new application. The decommissioner sends a decommissioning request to the developer when the degree of coverage provided by the decommissioner meets a decommissioning threshold. The decommissioner may designate a default decommissioning threshold and/or the developer may specify the decommissioning threshold. The degree of coverage may meet the decommissioning threshold even though the decommissioner has not implemented all the features of the legacy application. For example, a developer may assign legacy application logic a weight from 1 to 10, where a weight of 10 indicates a critical feature and a weight of 1 indicates an optional and/or non-critical feature. The degree of coverage may meet the decommissioning threshold when the features assigned a weight over 7 have been implemented by the decommissioning framework. When the degree of coverage meets the decommissioning threshold, the decommissioner sends a decommissioning request to the developer and inserts default decommissioning replacement logic to replace features not included in the degree of coverage.

The decommissioner solves the extraordinary technical challenges associated with decommissioning a legacy application and migrating legacy applications to new platforms and architectures. The decommissioner solves these extraordinary challenges by providing developers a tool to implement controlled phased migrations that allow organizations to introduce migrated functionality in manageable portions over time. The decommissioner also solves the technical challenges of decommissioning and migrating third-party GAPs where a developer does not have the ability to review the legacy source code of the third-party GAPs.

Other systems, methods, and features of the invention will be, or will become apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

DETAILED DESCRIPTION

Figure 1:
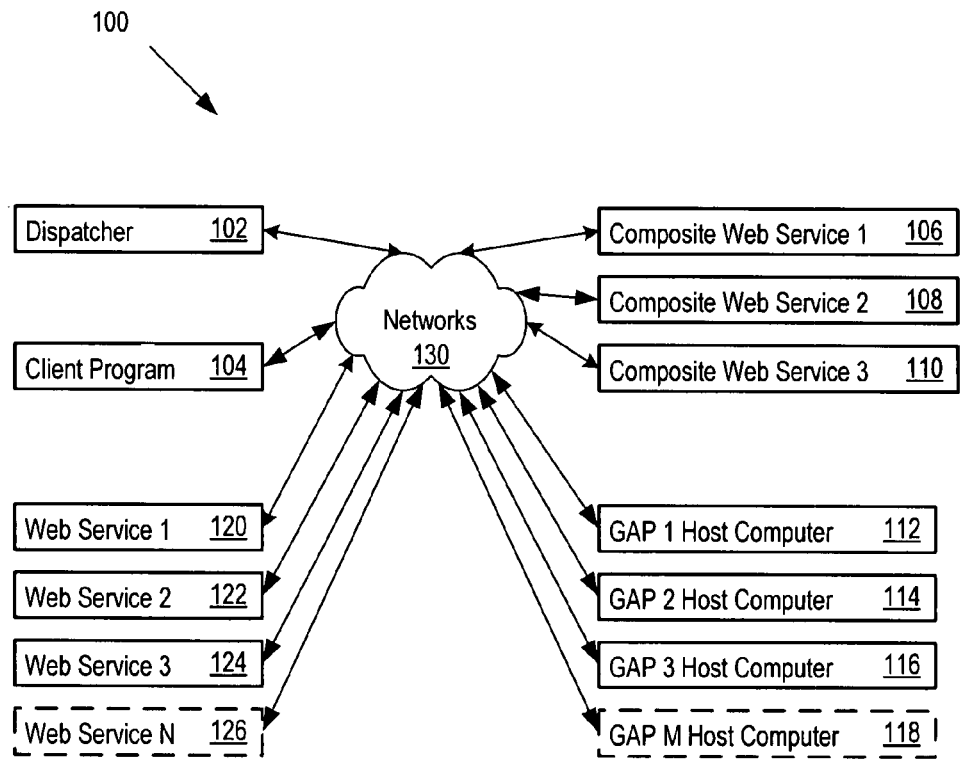
FIG. 1 illustrates an integrated system composing GUI-Based Applications and web services.

The decommissioner addresses the technical challenge of enabling GAPs to exchange information (i.e., interoperate)

with each other and web services. The decommissioner solves the technical problem of implementing controlled phased migrations of legacy applications (e.g., GAPs) that allow organizations to introduce migrated functionality in manageable portions over time, efficiently and non-invasively. The decommissioner also solves the technical challenges of migrating third-party GAPs where the organization does not have access to review the legacy source code of the third-party GAPs.

Phased migrations allow organizations to introduce migrated legacy application functionality over time, minimize the complexity of and isolate testing, and allow users time to become comfortable with the migrated functionality. Migration approaches that impose a non-phased approach take longer to complete, increase the complexity of testing, and impose a burden on users to adapt to an entire suite of migrated functionality all at once.

In contrast to GAPs, developers design web services as software components that flexibly exchange information over networks, including the Internet. Consequently, business industry demands for applications that easily and inexpensively exchange information has partly caused widespread acceptance of web services. Employing web services, unlike GAPs, enables organizations to quickly build integrated systems by composing (i.e., configuring) the web services for information exchange. Web services allow organizations to quickly migrate functionality from one application to another A developer may connect UI elements of a GAP with properties of the web service by placing logic that invokes the functionality of the GAP into a core web service. The logic specifies how the web service interacts with the legacy GAP. The developer selects a method for the web service, and determines how to invoke the web service. For example, an end user performing some action on a UI element (e.g., clicking a button on a GAP screen) invokes the method. The developer defines whether to pass the values of the UI elements as parameters to the invoked method, or use the values to set properties of the web service before invoking the method. In addition, the developer specifies how to use the return values of the invoked method, for example, whether to update selected UI elements of the GAPs with the values, or display the values in message dialogs. The developer creates core web services for GAPs and defines web service parameter relationships between web service parameters and UI elements of a GAP. The developer creates and deploys core web services based on web service definitions, user interface interaction specifications, and web service parameter relationships. The developer may define an action in response to certain return values of the invoked method. Once the developer creates the core web service making the legacy application interoperable, the developer may use the decommissioner to build an immutable web service wrapper to insert decommissioning replacement logic that can be used to incrementally replace the legacy application logic.

The decommissioner uses proxies to command and control GAPs and UI elements of GAPs to fulfil web service requests. When a proxy receives a response from a GAP, the proxy extracts data from the GAP, and forwards the extracted data to one or more web services. Proxies use hooks to perform various actions on UI elements and GAPs programmatically through accessibility API calls. Accessibility technologies allow hooks to register for different events produced by UI elements and GAPs monitored by accessibility APIs. One or more GAPs may run with a proxy and corresponding hooks on a single designated GAP host computer along with a accessibility API.

The decommissioner uses a dispatcher as a central point for coordinating proxies in a distributed environment. A proxy registers with the dispatcher under a unique name, collects GAP identification data and information about GAPs running with the proxy on a GAP host computer, and sends the collected GAP identification and information about GAPs to the dispatcher. The dispatcher uses the information collected from the proxies to route web service requests to proxies. The dispatcher routes web service request components of web services to GAP host computers, where corresponding proxies ultimately command and control GAPs and UI elements. The dispatcher acts as an intermediary that enables web services and GAPs to run on separate computers while presenting a common view to client programs. Because organizations may move web services and GAPs around the enterprise computing environment for various reasons (e.g., to improve business processes efficiencies or the performance of applications) the dispatcher provides web services and GAPs migration and location transparency to client programs.

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations may be depicted as being stored in memories, all or part of systems and methods consistent with the decommissioner may be stored on, distributed across, or read from other machine-readable media, for example, secondary storage devices such as hard disks, floppy disks, and CD-ROMs, a signal received from a network, or other forms of ROM or RAM either currently known or later developed.

Furthermore, although specific components of the decommissioner will be described, methods, systems, and articles of manufacture consistent with the system may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Logic that implements the processing and programs described below may be stored (e.g., as computer executable instructions) on a computer readable medium such as an optical or magnetic disk or other memory. Alternatively or additionally, the logic may be realized in an electromagnetic or optical signal that may be transmitted between entities. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors, and may be implemented or distributed as shared libraries, application programming interfaces (APIs), or in other forms. Furthermore, the programs, or any portion of the programs, may instead be implemented in hardware.

FIG. 1 illustrates an example of an Integrated System 100 that includes composed GUI-Based Applications and web services. In the example shown in FIG. 1, the Integrated System 100 include a dispatcher 102, a client program 104, composite web services 106, 108, and 110, GAP host computers 112, 114, and 116, and web services 120, 122, 124, and 126. The Integrated System 100 components may communicate through a Network 130 such as the Internet. The Integrated System 100 uses the dispatcher 102 to coordinate communication between GAPs, web services, and composite web services. When a client program 104 invokes a web service method managed by a web service 120-126 or composite web service 106-110, the designated web service sends one or more requests to the dispatcher 102, which routes the requests to the appropriate GAP host computers 112, 114, 116 and 118. The GAPs running on their respective GAP host computers 112, 114, 116, and 118 complete the requests and return responses to the dispatcher 102. The dispatcher 102 forwards the responses to the appropriate web services (e.g., web services 120-126 or composite web services 106-110), which send responses to the client program 104. Prior to composing the Integrated System 100 using the GAPs and web services, each business process operation that the client program 104 invoked required agents to interact with the one or more GAPs separately, because of a lack of interoperability between the one or more GAPs.

Figure 2:
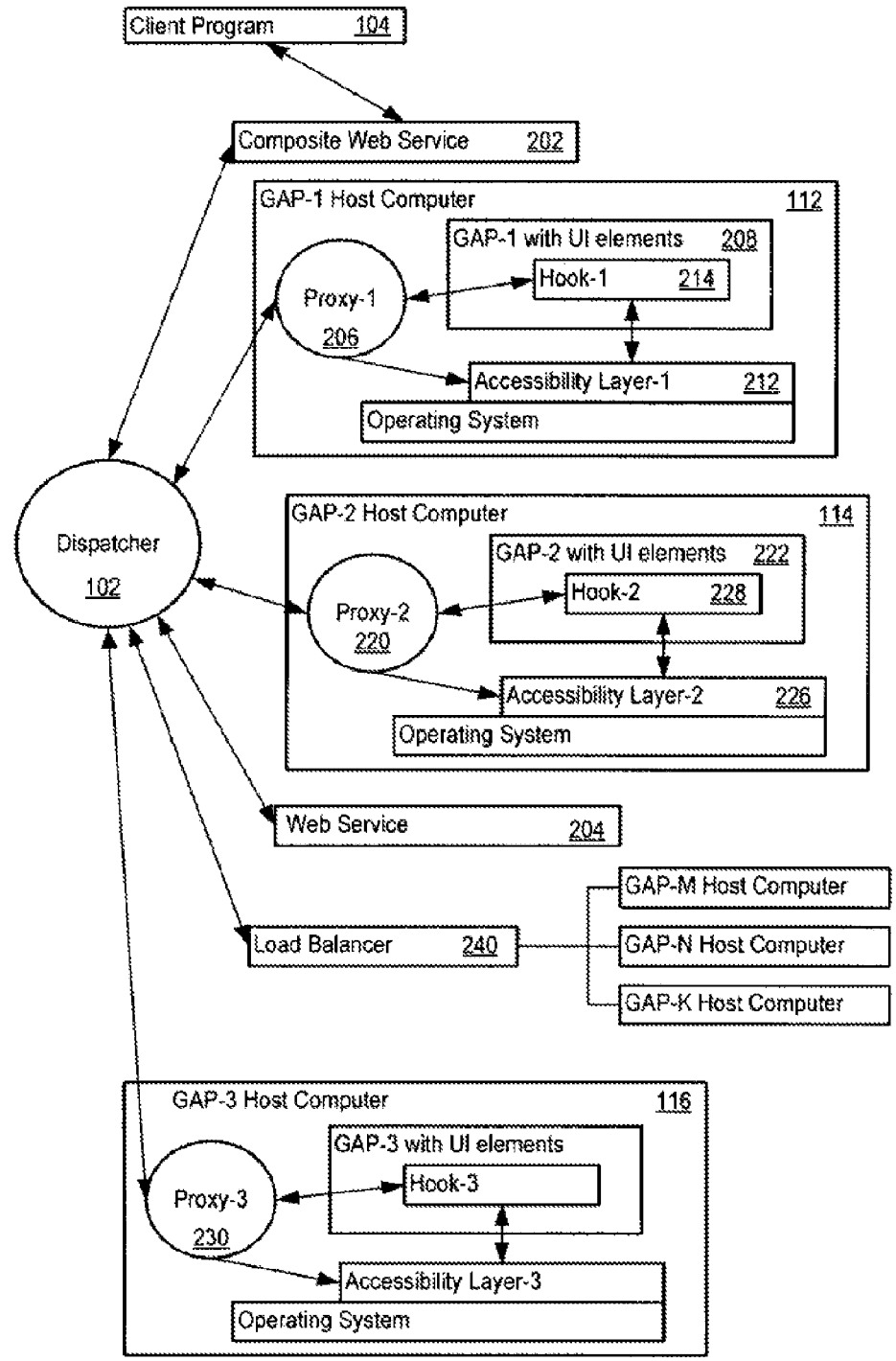
FIG. 2 shows a dispatcher coordinating communication between GAPs and web services.

FIG. 2 shows a dispatcher 102 coordinating communication between GAPs and web services. The dispatcher 102 acts as an intermediary that enables web services and GAPs to run on separate computers while presenting a common view to client programs 104. Because organizations may move web services and GAPs around the enterprise computing environment for various reasons (e.g., to improve business processes efficiencies or the performance of applications) the dispatcher 102 provides web services and GAPs migration and location transparency to client programs 104. In one implementation, when a client program 104 invokes a web service method corresponding to a composite web service 202, the composite web service 202 sends one or more web service request components to dispatchers, such as the dispatcher 102. A composite web service may include multiple request components (e.g., methods that need to be invoked to implement full control over multiple GAPs). The dispatcher 102 determines to which proxies (e.g., proxy-1 206, proxy-2 220 and proxy-3 230) to route the web service request components, based on information collected from the proxies. A proxy registers with the dispatcher 102 under a unique name, collects GAP identification data and information about the GAPs running on the GAP host computer (e.g., GAP-1 host computer 112, GAP-2 host computer 114, and GAP-3 host computer 116) with the proxy, and sends the GAP identification data and information to the dispatcher 102.

In one implementation, when proxy-1 206 receives a web service request component the proxy-1 206 interacts with one or more UI elements of the GAP-1 with UI elements 208 through the hook-1 214, in response to the web service request component. The accessibility layer-1 212 may support hook-1 214 to perform various actions on GAP-1 with UI elements 208 programmatically. Proxy-2 220 in communication with GAP-2 host computer 114 for GAP-2 with UI elements 222 and hook-2 228 may register the GAP-2 with UI elements 222 with the dispatcher 102, resulting in a second composite web service request component of the composite web service to route through the dispatcher 102 to the GAP-2 host computer 114. In one implementation, when proxy-2 220 receives the second web service request component the proxy-2 220 interacts with one or more of the UI elements of the GAP-2 with UI elements 222 through the hook-2 228, in response to the second web service request component. The accessibility layer-2 226 may support hook-2 228 to perform various actions on GAP-2 with UI elements 222 programmatically. The dispatcher 102 may use a load balancer 240 to route web service requests to multiple GAP host computers.

In one implementation of the Integrated System 100 multiple instances of a GAP (e.g., Acme Expense GAP (AEG)) run concurrently on separate GAP host computers (e.g., GAP-1 host computer 112, GAP-2 host computer 114, and GAP-3 host computer 116). The dispatcher 102 assigns each instance of AEG a unique GAP identifier, enabling the dispatcher 102 to coordinate parallel execution of multiple instances of AEG, so that when the composite web service 202 sends a composite web service request component to the dispatcher 102 in response to a request from a client program 104 the dispatcher 102 routes the composite web service request component to the correct instance of AEG.

Figure 3:
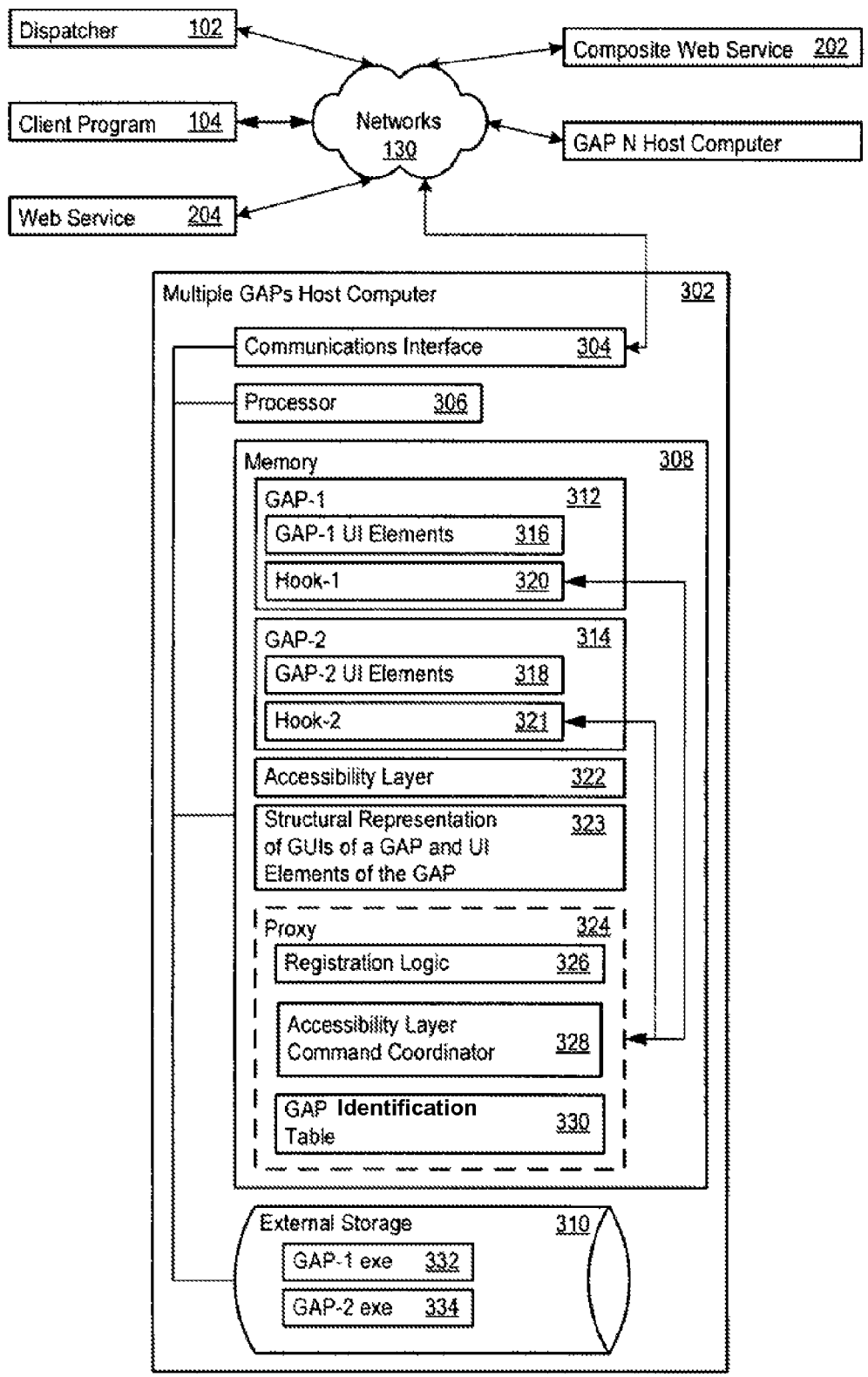
FIG. 3 illustrates a GAP host computer concurrently running two GAPs.

FIG. 3 illustrates a GAP host computer 302 concurrently running two GAPs. In one implementation, a single GAP host computer may run multiple GAPs, and include, in addition to a communications interface 304 to communicate with various components of an Integrated System 100, a processor 306, memory 308, and external storage 310. The memory 308 may include instances of different GAPs running (e.g., GAP-1 312, and GAP-2 314), GAP-1 UI elements and GAP-2 UI elements corresponding to GAP-1 312 and GAP-2 314, respectively, a hook-1 320 and hook-2 321, accessibility layer 322, a structural representation of GUIs of a GAP and UI element of the GAP 323, and a proxy 324. In one implementation GAP-1 312 may represent an instance of a third-party closed and monolithic Windows GAP (e.g., an Acme Expense GAP (AEG)) that a company uses internally to keep track of purchases, and GAP-2 314 may represent a closed and monolithic GAP named My Invoices and Estimates (MIE) that the company uses to create invoices for ordered goods.

In one implementation, the accessibility layer 322 supports hook-1 320 and hook-2 to perform various actions programmatically on GAP-1 312, GAP-1 UI elements 316, and GAP-2 314 and GAP-2 UI elements 318, respectively. The accessibility layer 322 may also assist with capturing a structural representation of GUIs of a GAP and UI elements of the GAP 323, as a result of interactions with the GAP. The structural representation of GUIs of a GAP and UI elements of the GAP 323 may provide the proxy 324, hook-1 320 and hook-2 321 comprehensive information to locate, control, and manipulate GAP-1 312, GAP-2 314, GAP-1 UI elements 316, and GAP-2 UI elements 318. The structural representation of GUIs of a GAP and UI elements of the GAP 323 may be implemented as objects (e.g., an XML file) that capture depth-first traversals of the GUI, breadth first traversal of the GUI, or that otherwise stores the interface elements and screen sequences of the GUI. The proxy 324 may analyze the structural representation of GUIs of a GAP and UI elements of the GAP 323 to locate a GAP UI element in the GAP GUI.

The proxy 324 may include registration logic 326, an accessibility layer command coordinator 328, and a GAPs identification table 330. The proxy 324 may use the registration logic 326 to register GAP-1 312 and GAP-2 314 with the dispatcher. The accessibility layer command coordinator 328 may control GAP-1 312 and GAP-1 UI elements 316 through hook-1 320, in response to a web service request component. To that end, the accessibility layer command coordinator 328 may receive web service request components, extract the graphical user interface element identifiers, a structural representation of a GAP, and the requested action on the identified graphical user interface element. The accessibility layer command coordinator 328 may then traverse the structural representation 323 to determine where the identified graphical user interface element resides in the GAP user interface, and make calls to the hook to navigate the GAP to the interface that includes the identified graphical user interface element. Once at the appropriate interface, the accessibility layer command coordinator 328 may then exercise the graphical user interface element through the hook to perform the requested action.

In another implementation, proxy-1 206 uses an accessibility layer command coordinator running on and dedicated to GAP-1 host computer 112 to control GAP-1 with UI elements 208 through hook-1 214, in response to a web service request component. The proxy 324 may collect GAP identification data and information about GAPs (e.g., GAP-1 312, and GAP-2 314) hosted with proxy 324 on the multiple GAPs host computer 302, and stores the collected GAP identification data and information about the GAPs in the GAPs identification table 330. In one implementation, the proxy 324 may store GAP Identifiers for multiple locally hosted GAPs (e.g., GAP-1 312, and GAP-2 314) in the GAP identification table 330. The proxy 324 may periodically send the collected GAP identification data and information about the GAPs to the dispatcher 102. The multiple GAPs host computer 302 may use the external storage 310 to store the GAP-1 exe 332 and GAP-2 exe 334 programs.

In an alternative implementation, the dispatcher 102 receives a web service request message from the web service 204 that includes a GAP UI element Identifier and an action request identifier for a specific GAP UI element (e.g., GAP-1 UI elements 316). The GAP UI element may correspond to a GAP (e.g., GAP-1 312) executing in memory 308. The dispatcher 102 may send the web service request message to proxy 324, which extracts the GAP UI element identifier and action request identifier from the web service request message. The proxy 324 may perform an action against the GAP-1 UI elements 316 specified in the action request identifier through hook-1 320. The action request identifier may include a GUI element data setting action, or a GUI element data retrieval action that the proxy performs through hook-1 320 against the GAP-1 UI elements 316 specified in the action request identifier.

Figure 4:
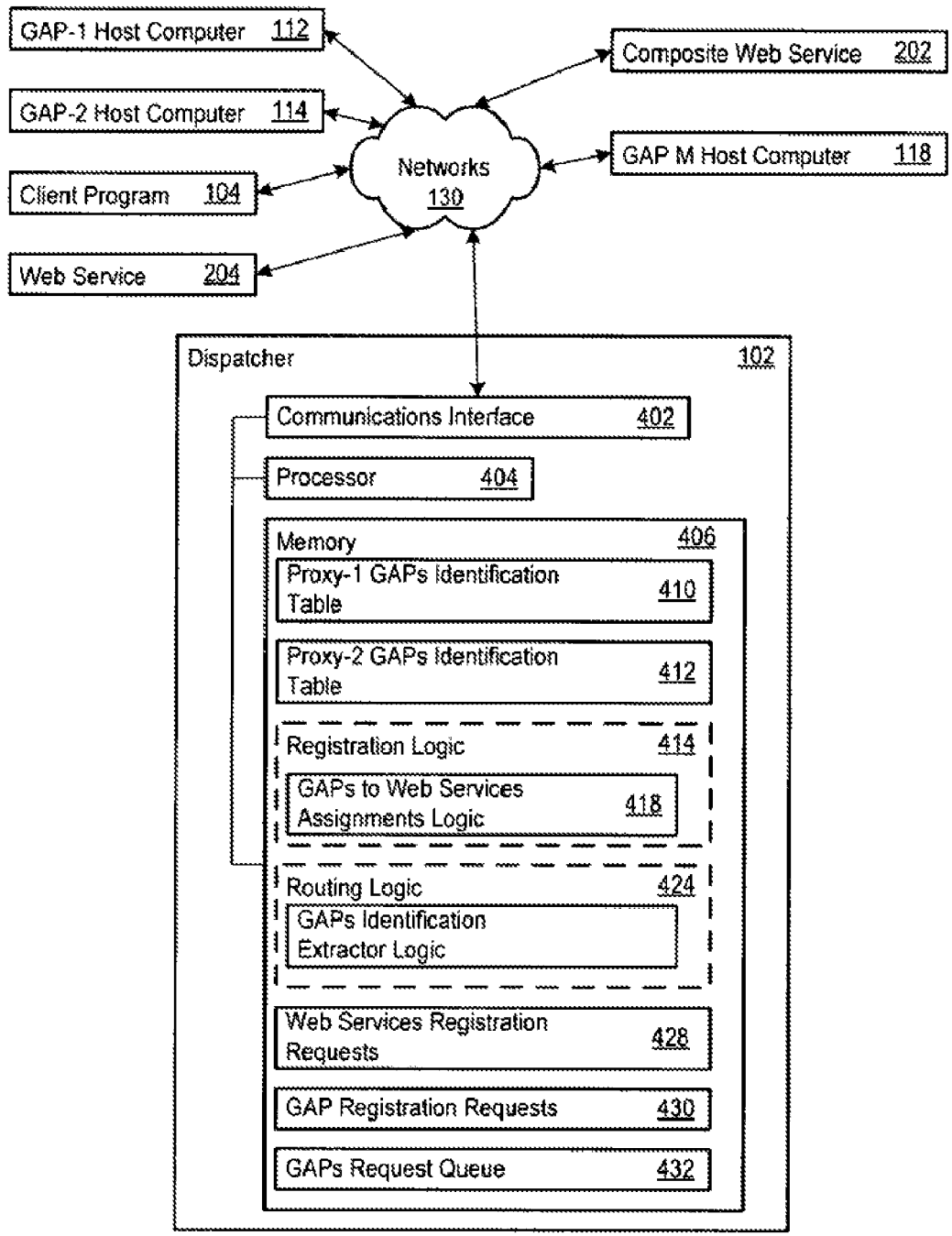
FIG. 4 shows a dispatcher and dispatcher components.

FIG. 4 shows a dispatcher 102 and dispatcher components. The dispatcher 102 may include a communications interface 402, a processor 404, and memory 406. The dispatcher 102 memory 406 may include a proxy-1 GAPs identification table 410, a proxy-2 GAPs identification table 412, Registration logic 414, Routing logic 424, web services registration requests 428, GAP registration requests 430, and a GAPs request queue 432. The dispatcher 102 may be used as a central point for coordinating proxies (e.g., proxy-1 206 and proxy-2 220) in a distributed environment. A proxy (e.g., proxy-1 206 and proxy-2 220) may register with the dispatcher 102 under a unique name, and periodically collect GAP identification data and information about GAPs running with the proxy on the GAP Host computers (e.g., GAP-1 host computer 112, and GAP-2 host computer 114), and send the collected GAP identification data and information about GAPs to the dispatcher 102. The dispatcher 102 may store the collected information from each proxy in separate proxy GAPs identification tables (e.g., proxy-1 GAPs identification table 410, and proxy-2 GAPs identification table 412). The proxy GAPs identification tables may contain GAP identification data and information for multiple GAPs. For example, as shown in FIG. 3, the proxy 324 may periodically send the dispatcher 102 the GAPs identification table 330, which may include GAP identification data and information for GAP-1 312 and GAP-2 314.

In one implementation, when a client program 104 invokes a method of a web service 204 or composite web service 202, the web service 204 or composite web service 202 to which the method belongs sends a web services registration request 428 to the dispatcher 102. The dispatcher 102 may identify the GAPs required to fulfil a method of a web service 204, or a composite web service 202. The dispatcher 102 may use registration logic 414 to receive GAP registration requests 430 from GAPs and web services registration requests 428 from web services 204, and composite web services 202. The dispatcher 102 may also use the registration logic 414 to control GAPs to web services assignments logic 418 to analyze the proxy GAPs identification tables to assign GAPs and UI elements to methods of web-services 204, and methods of composite web services 202. In one implementation, the registration logic 414 instantiates the proxy GAPs identification table (e.g., proxy-1 GAPs identification table 410, and proxy-2 GAPs identification table 412) in response to a GAP registration request 430 from a GAP. The dispatcher 102 may include a GAPs request queue 432 to store web service requests and web service request components when a web service requests an unavailable GAP, which will be explained in further detail below.

Figure 5:
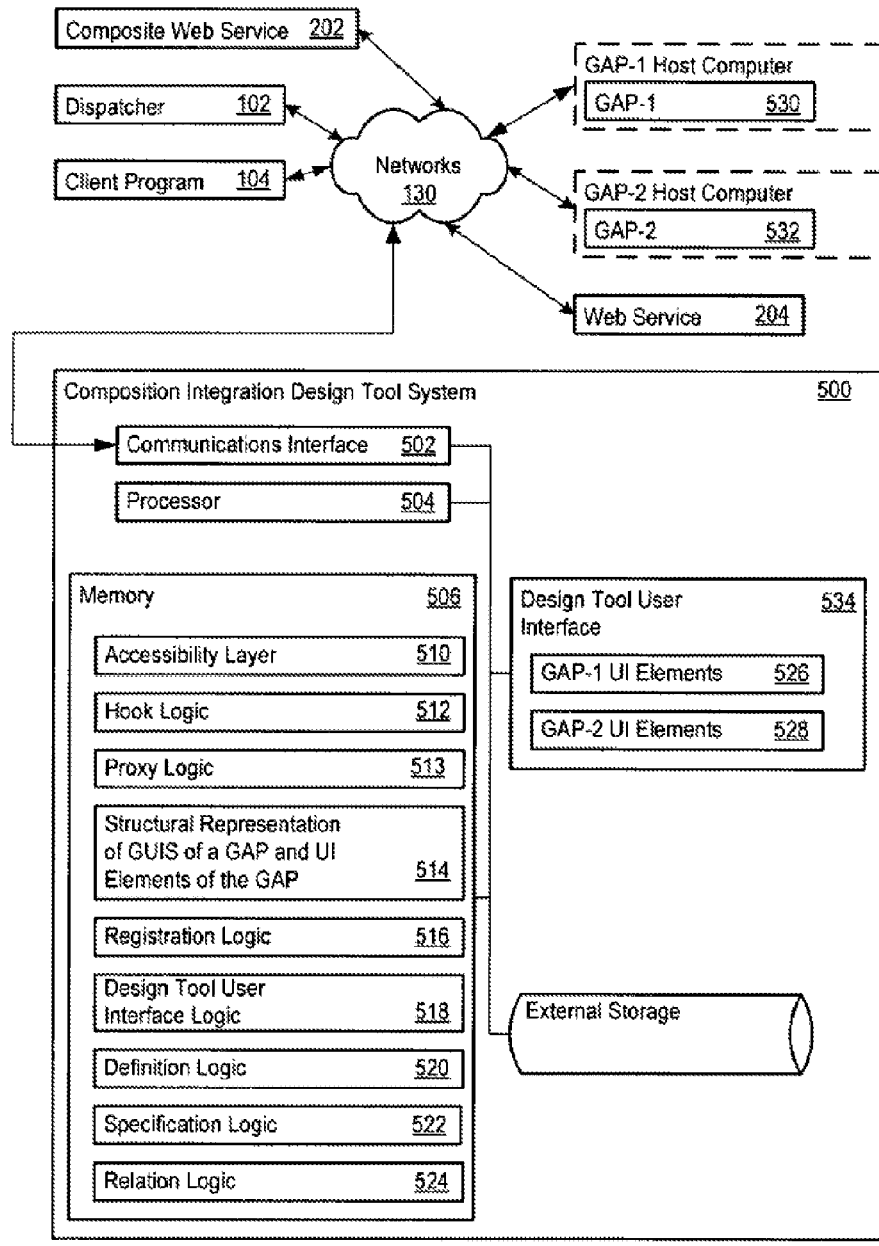
FIG. 5 shows a composition integration design tool system.

FIG. 5 shows a composition integration design tool system 500. The composition integration design tool system 500 may include a communications interface 502, a processor 504, and memory 506. The composition integration design tool system 500 memory 506 may include interaction logic 508, accessibility layer 510, hook logic 512, proxy logic 513, a structural representation of GUIs of a GAP and UI elements of the GAP 514, registration logic 516, design tool user interface logic 518, definition logic 520, specification logic 522, and relation logic 524.

The interaction logic 508 captures one or more GAP-1 UI elements 526, and one or more GAP-2 UI elements 528 using the accessibility layer 510. In other words, the Interaction logic 508 may capture a structural representation of GUIs of a GAP and UI elements of the GAP 514 through the accessibility layer 510 using the hook logic 512 to communicate with the GAPs (e.g., GAP-1 530, GAP-2 532, and corresponding GAP-1 UI elements 526 and GAP-2 UI elements 528). Proxy logic 513 may control the GAPs through the hook logic 512, and the proxy logic 513 may use the registration logic 516 to send GAP registration requests 430 to the dispatcher 102. The structural representation of GUIs of a GAP and UI elements of the GAP 514 may include a GAP UI element label, a UI element Identifier, and location information in the GAP GUI for the GAP UI elements (e.g., GAP-1 UI elements 526 and GAP-2 UI elements 528), and may also include a GAP GUI screen sequence representation for each GAP GUI screen sequence.

Figure 6:
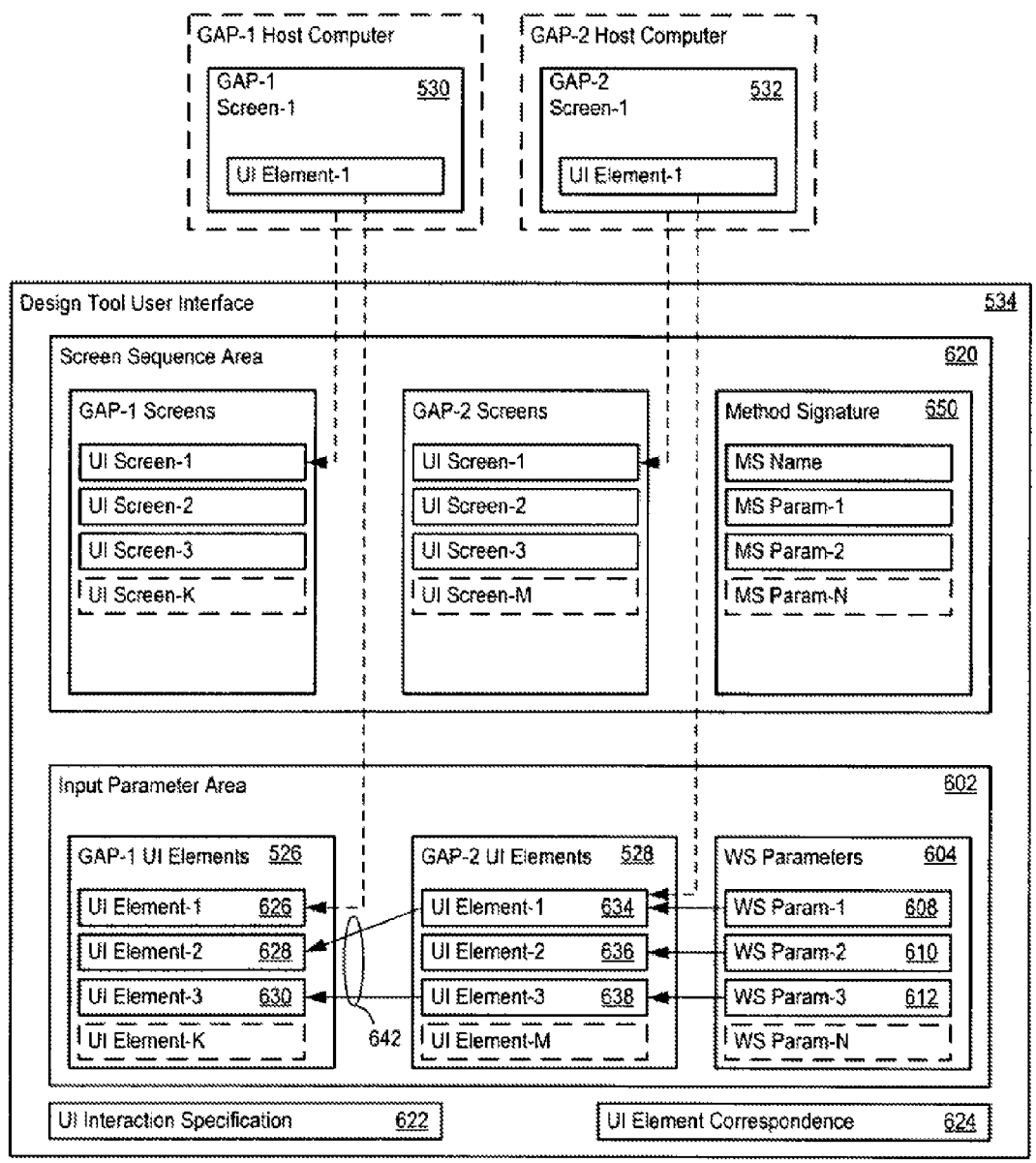
FIG. 6 shows one example implementation of a design tool user interface.

FIG. 6 shows one example implementation of a design tool user interface 518. The design tool user interface logic 518 may generate a design tool user interface 534 that includes an input parameter area 602 and a screen sequence area 620. The design tool user interface logic 518 provides additional, fewer, or different interface elements. The design tool user interface logic 518 may include a point-and-click interface, drag-and-drop interface or both a point-and-click interface, drag-and-drop interface between GAP UI elements (e.g., GAP-1 UI elements 526 and GAP-2 UI elements 528) and the input parameter area 602, and determine operator selections (i.e., UI interactions) of GAP UI elements, as well as web service parameters 604 (e.g., WS parameter-1 608, WS parameter-2 610, and WS parameter-3 612). The design tool user interface 534 may use the drag-and-drop interface to move GAP UI elements (e.g., GAP-1 UI elements 526 and GAP-2 UI elements 528) and web service parameters 604 into the input parameter area 602, and the GAP GUI screen sequences into the screen sequence area 620 to establish a user interface interaction specification 622 that creates a UI element correspondence 624 between at least one of the GAP-1 UI elements 526 (e.g., GAP-1 UI element-1 626, GAP-1 UI element-2 628, and GAP-1 UI element-3 630) and at least one of the GAP-2 UI elements 528 (e.g., GAP-2 UI element-1 634, GAP-2 UI element-2 636, and GAP-2 UI element-3 638). For example, FIG. 6 shows an arrow 642 drawn (e.g., by an operator or from input from an automated analysis tool) from GAP-2 UI element-1 634 to GAP-1 UI element-2 628, which establishes a UI element correspondence 624 between the two GAP UI elements. The design tool user interface 534 may include a method signature 650 that defines the name of a web service method, the parameters, and the method type. The method signature 650 may also specify error or exception handling procedures and the parameter types of each method parameter.

Figure 7:
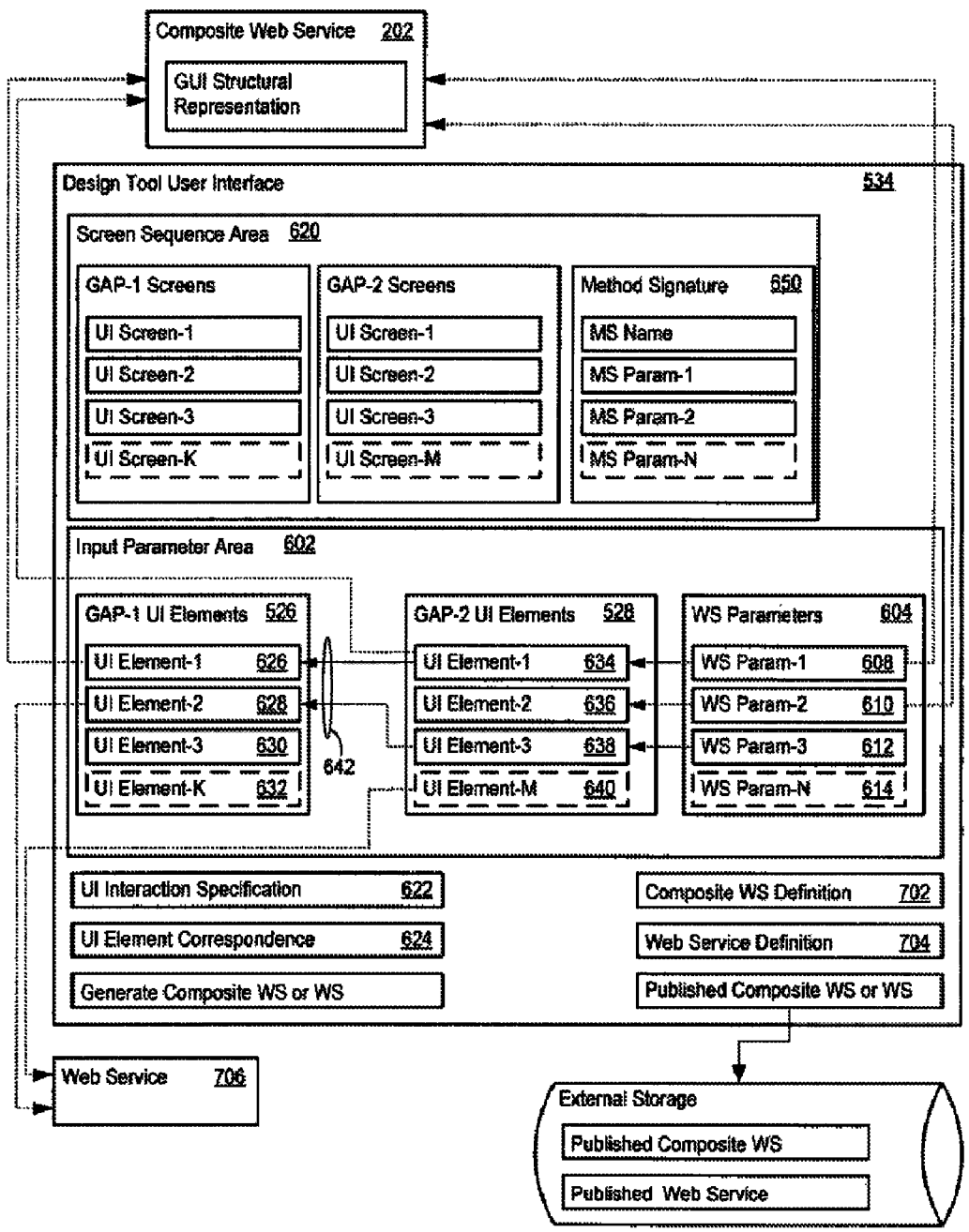
FIG. 7 shows a design tool user interface and composite web service.

FIG. 7 shows a design tool user interface and composite web service. The design tool user interface 534 may use the definition logic 520 to establish a composite web service definition 702. Thus, the definition logic 520 may establish the composite web service definition 702 for a composite web service 202, including one or more web service parameters 604 (e.g., WS parameter-1 608, WS parameter-2 610, and WS parameter-3 612), a web service name, or other web service parameters. The design tool user interface 534 may generate the composite web service 202, and publish the composite web service 202. The design tool user interface 534 may use the definition logic 520 to establish a web service definition 704 for a web service 706, based on the structural representation of GUIs of a GAP and UI elements of the GAP 514 using the accessibility layer 510. The design tool user interface 534 may use the specification logic 522 to establish the user interface interaction specifications 622. For example, the specification logic 522 may create the UI element correspondence 624 between at least one of the GAP-1 UI elements 526 (e.g., GAP-1 UI element-1 626, GAP-1 UI element-2 628, and GAP-1 UI element-3 630) and at least one of the GAP-2 UI elements 528 (e.g., GAP-2 UI element-1 634, GAP-2 UI element-2 636, and GAP-2 UI element-3 638). For example, the user interface interaction specification 622 may create a UI element correspondence 624 between the GAP-2 UI element-1 634 and the GAP-1 UI element-2 628 that defines an exchange of an invoice amount from the GAP-2 UI element-1 634 (e.g., an invoice field amount in the MIE GAP) to an expense amount in the GAP-1 UI element-2 628 (e.g., an expense field amount in the AEG). The specification logic 522 may establish the user interface interaction specification 622 from multiple GAP-1 UI elements 526 (e.g., GAP-1 UI element-1 626, GAP-1 UI element-2 628, and GAP-1 UI element-3 630), to multiple GAP-2 UI elements 528 (e.g., GAP-2 UI element-1 634, GAP-2 UI element-2 636, and GAP-2 UI element-3 638).

Figure 8:
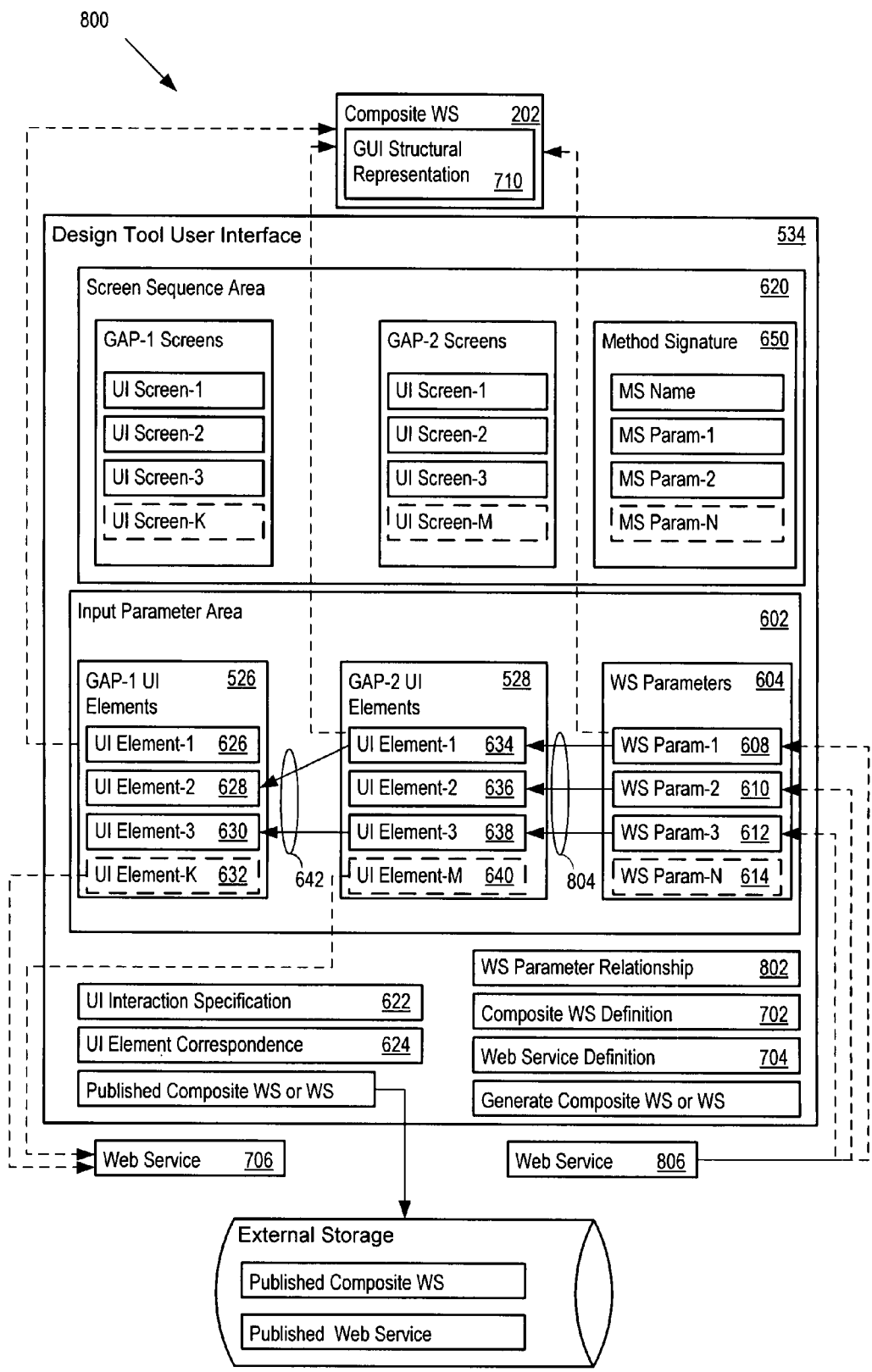
FIG. 8 shows a design tool user interface and web service parameter relationship.

FIG. 8 shows a design tool user interface and web service parameter relationship. The relation logic 524 may establish a web service parameter relationship 802 between at least one of the web service parameters 604 (e.g., WS parameter-1 608, WS parameter-2 610, and WS parameter-3 612), and at least one of the GAP-2 UI elements 528 (e.g., GAP-2 UI element-1 556, GAP-2 UI element-2 558, and GAP-2 UI element-3 560). For example, FIG. 8 shows arrows 804 drawn (e.g., by an operator or from input from an automated analysis tool) from WS parameter-3 612 to GAP-2 UI element-3 638, that establish a web service parameter relationship 802 between a web service parameter and GAP UI element. The web service parameter relationship 802 may specify each of the GAP UI element labels of the GAP UI elements used. In another implementation, the relation logic 514 may establish a web service parameter relationship 802 between at least one of the web service parameters 604 (e.g., WS parameter-1 608, WS parameter-2 610, and WS parameter-3 612), and at least one of the GAP-1 UI elements 526 (e.g., GAP-1 UI element-1 626, GAP-1 UI element-2 628, and GAP-1 UI element-3 630) or at least one of the GAP-2 UI elements 528 (e.g., GAP-2 UI element-1 634, GAP-2 UI element-2 636, and GAP-2 UI element-3 638). In one implementation, the composite web service definition 702 for a composite web service 202 may include multiple web service parameters defined by a combination of GAP-1 UI elements 526, GAP-2 UI elements 528, and web service parameters 604 (e.g., WS parameter-1 608, WS parameter-2 610, and WS parameter-3 612) of a web service 804. The composition integration design tool system 500 may generate a web service 706 based on the web service definition 704 and the web service parameter relationship 802, and publish the web service 706.

Figure 9:
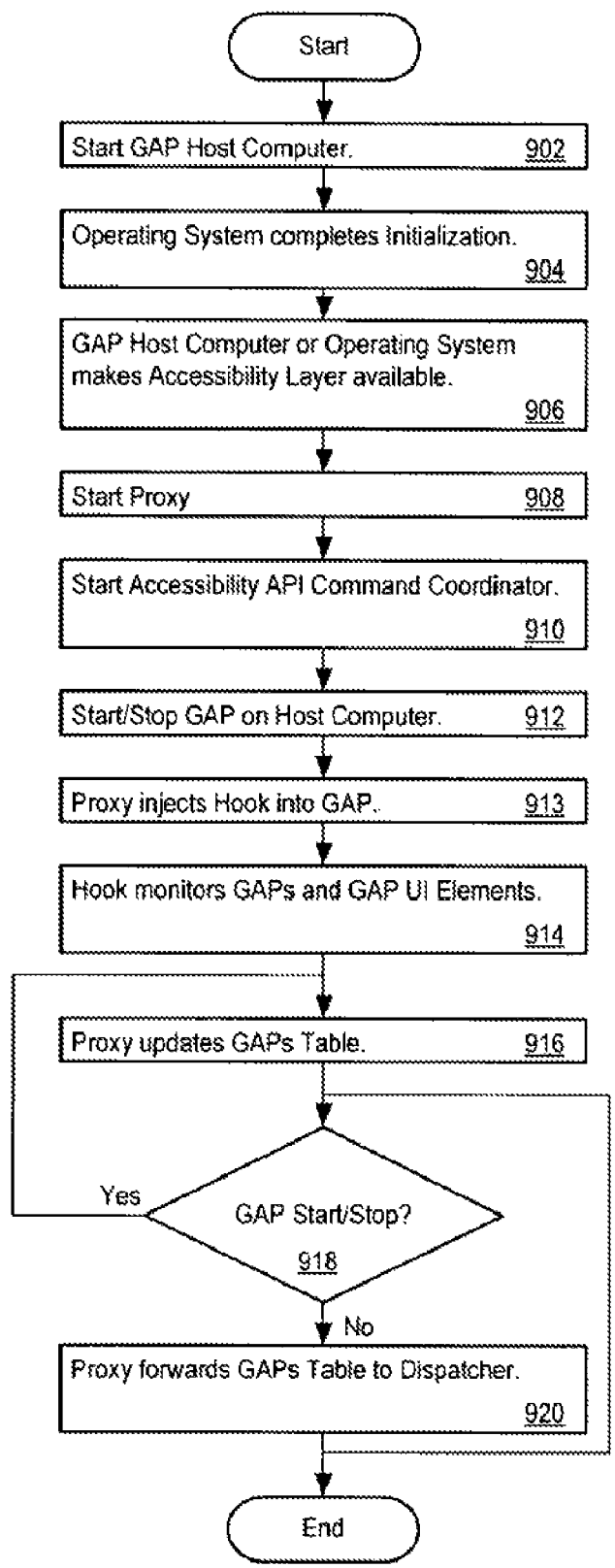
FIG. 9 shows the acts that a proxy may take to register GAPs with a dispatcher.

FIG. 9 shows the acts that a proxy, including the registration logic 326, may take to register GAPs with a dispatcher. Each GAP host computer runs a dedicated proxy that commands and controls the GAPs and UI elements hosted on the GAP host computer through dedicated hooks also hosted on the GAP host computer. The hooks perform actions on the GAPs and UI elements through the accessibility layer. Once the GAP host computer starts (Act 902) and the operating system completes initialization (Act 904), the operating system or GAP host computer makes the accessibility layer available (Act 906). The proxy starts (Act 908), and the proxy initiates the accessibility API command coordinator (Act 910). GAPs start or stop execution on the host computer (Act 912), during the operation of the host computer. The proxy injects (e.g., load) a hook into a GAP after the GAP starts (Act 913). Through the accessibility API command coordinator, the proxy directs the hook to monitor a GAP and GAP UI elements (Act 914). The hook forwards monitored GAP and UI element data and information to the proxy, which updates the GAPs Table (Act 916). If another GAP starts or stops execution (Act 918) the proxy updates the GAPs Table (Act 916). The proxy may periodically forward the GAPs Table to the dispatcher (Act 920).

Figure 10:
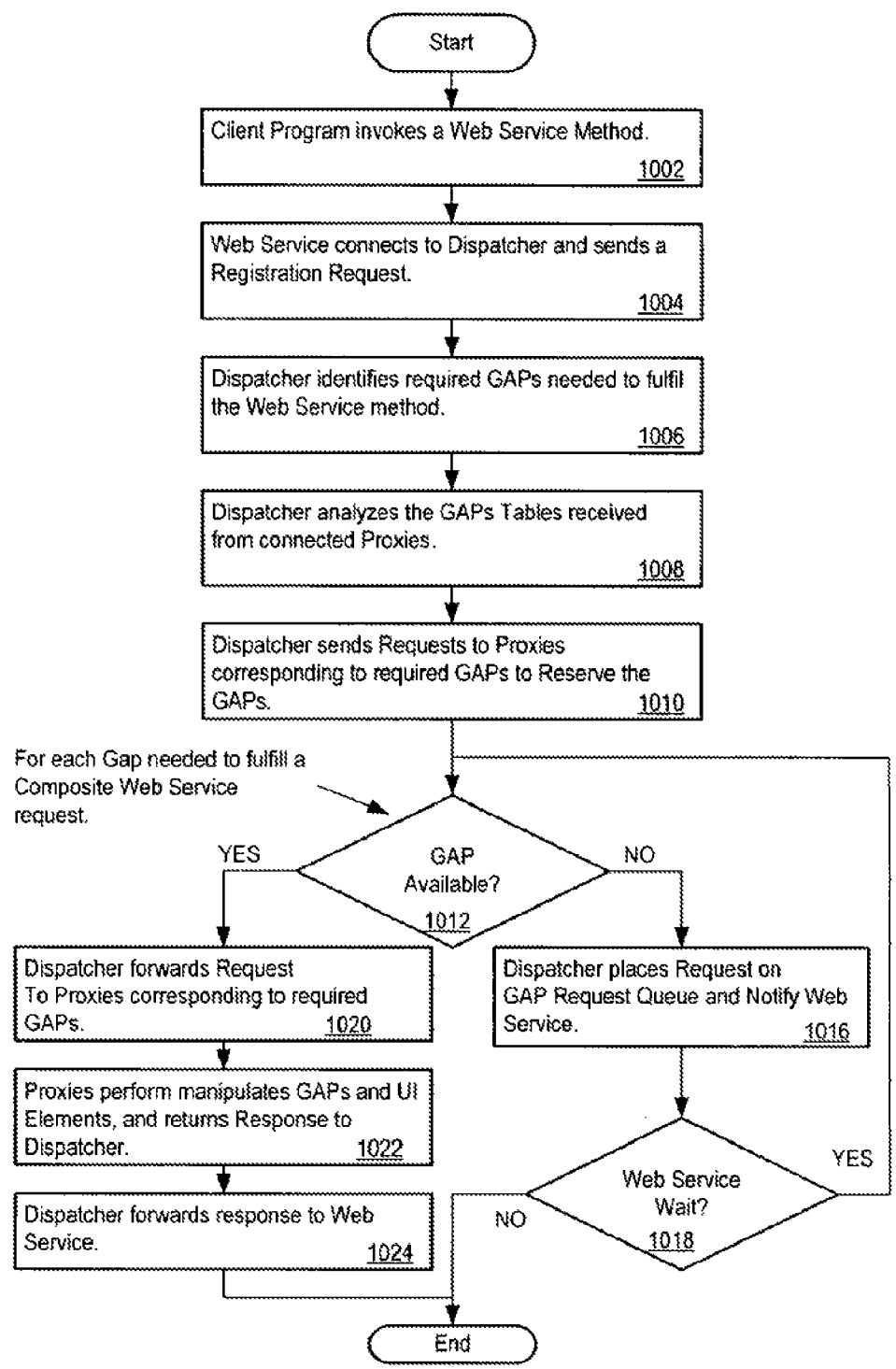
FIG. 10 shows the acts that a dispatcher may take to register a web service, and coordinate communication between web services and proxies.

FIG. 10 shows the acts that a dispatcher may take to register a web service, and coordinate communication between web services and proxies. When a client program invokes a method of a web service or a web service request component (Act 1002), the requesting web service or composite web service (e.g., web service 204 or composite web service 202) to which the method belongs connects to the dispatcher 102, and sends a web services registration request 428 (Act 1004). The dispatcher 102 may determine from the web services registration request 428 the identity of the GAPs required to fulfil the web service or composite web service method (Act 1006). The dispatcher may analyze the GAP Tables received from connected proxies (Act 1008), and sends web service requests or web service request components to the appropriate proxies to reserve the required GAPs (Act 1010). Web service requests and web service request components may include GAP identification data and information about the required GAP, the GAP UI elements, requested actions to perform on the GAP and UI elements, and the information to return to the requesting web service or composite web service. The dispatcher and proxy corresponding to a required GAP may communicate to determine the availability of a GAP (Act 1012). For unavailable GAPs, the dispatcher 102 may place the web service request or web service request component on the dispatchers GAP request queue and notifies the requesting web service or composite web service (e.g., web service 204 or composite web service 202) (Act 1016). The requesting web service or composite web service may determine whether to wait for an unavailable GAP to change status to available (Act 1018). For available GAPs, the dispatcher may forward the web service request or web service request component to the proxies corresponding to the required GAPs (Act 1020). The proxies corresponding to the required GAPs may command and control the GAPs and UI elements according to the web service request or web service request component, and return responses to the dispatcher 102 (Act 1022). The dispatcher may forward responses from proxies to the requesting web service or composite web service, or other web services or composite web services if required (Act 1024).

Figure 11:
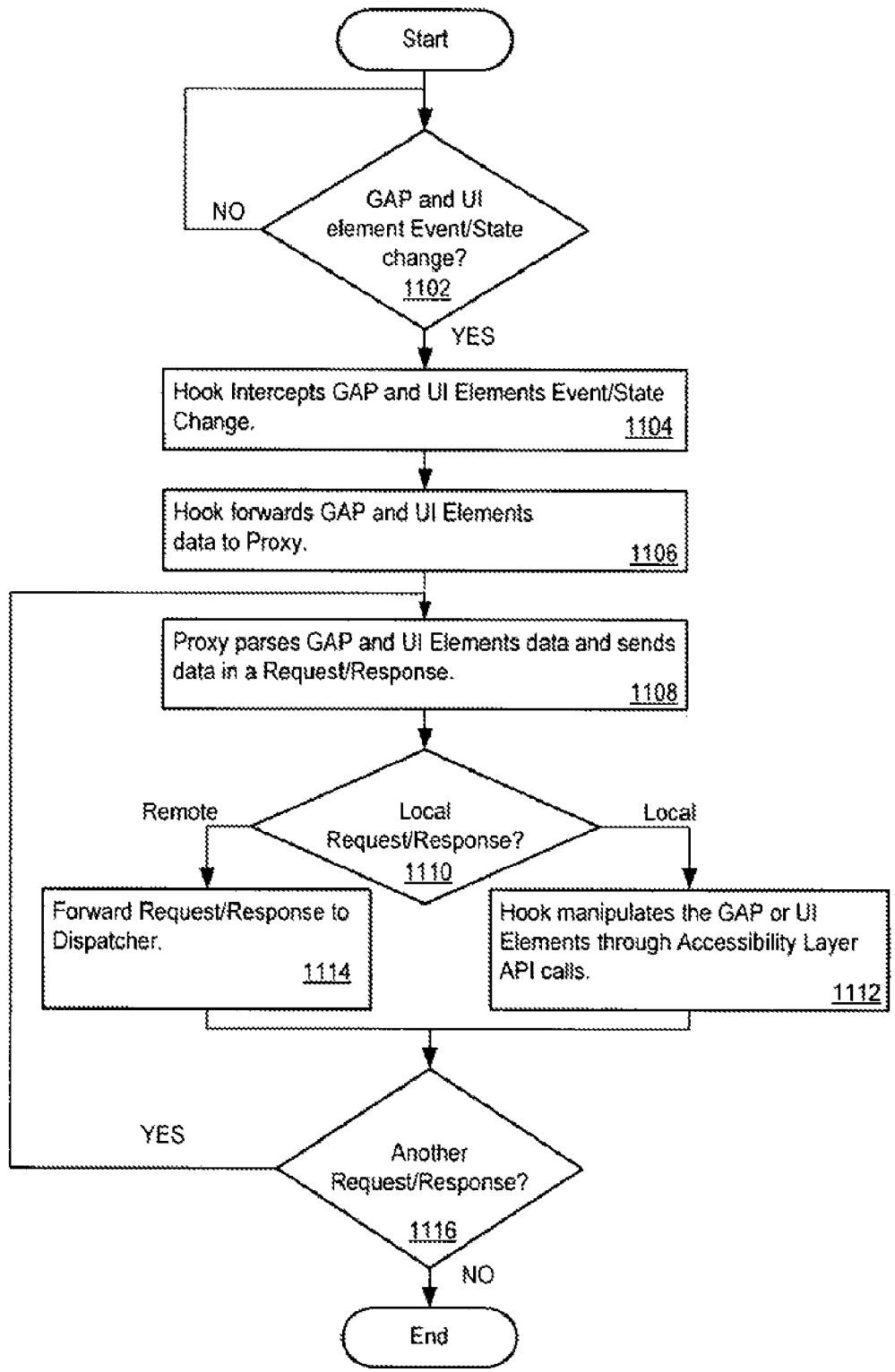
FIG. 11 shows the acts that a hook may take to command and control a UI element.

FIG. 11 shows the acts that a hook may take to command and control a UI element. The hook monitors a GAP and UI elements for event and state changes (Act 1102). When a GAP or UI element event or state changes the hook intercepts the event or state change (Act 1104). The hook forwards GAP and UI element event and state change information to the controlling proxy (Act 1106). The proxy parses GAP and UI element data, and prepares to send information in a request or response to the appropriate destination (Act 1108). The proxy identifies the destination of the request or response as Local or Remote (Act 1110). For Local requests or responses, the proxy forwards the request or response to the hook, and the hook manipulates the GAP or UI elements through accessibility layer API calls (Act 1112). For remote requests or responses, the proxy forwards the request or response to the dispatcher (Act 1114), and the proxy determines whether to parse additional GAP and UI elements data from the hook (Act 1116).

Figure 12:
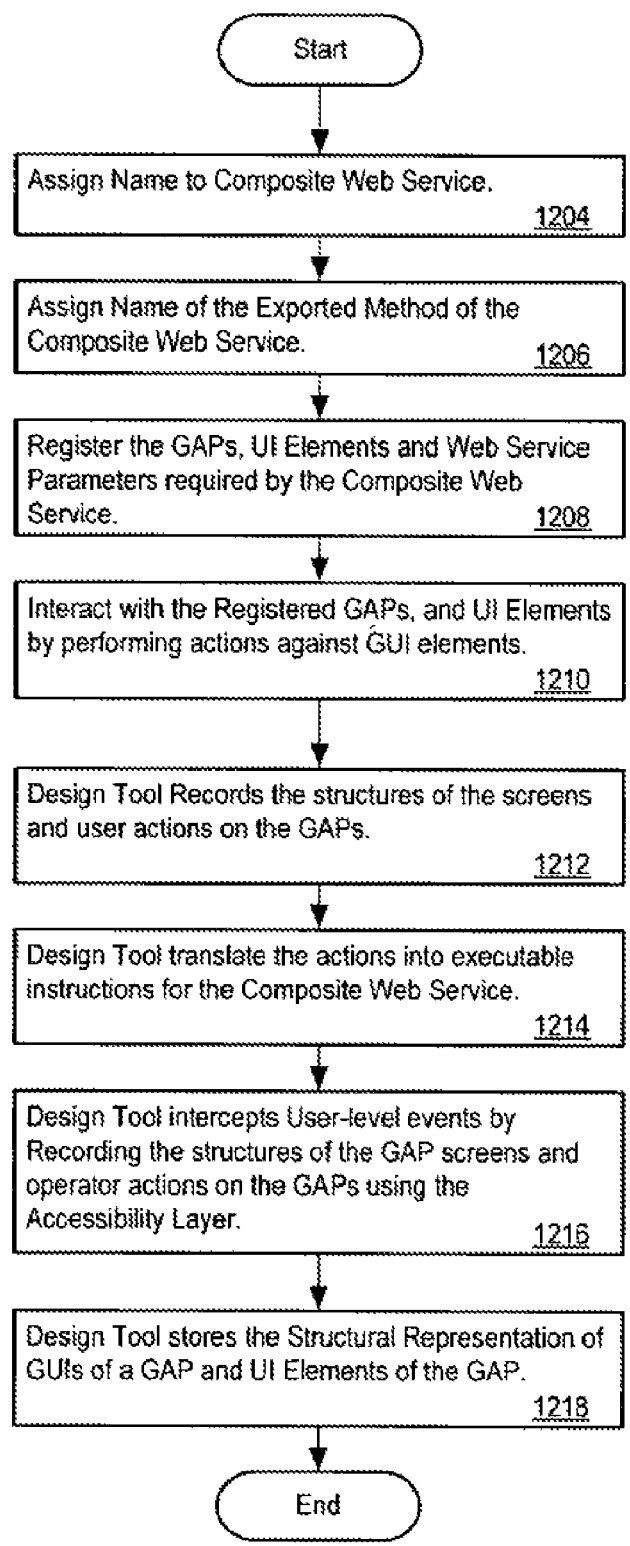
FIG. 12 shows the acts the composition integration design tool system may take to capture the structural representation of GUIs of a GAP and UI elements of the GAP.

FIG. 12 shows the acts the composition integration design tool system may take to capture the structural representation of GUIs of a GAP and UI elements of the GAP. The operator assigns a name to the composite web service (Act 1204), and the operator assigns a name to the exported or published method of the composite web service (Act 1206). The operator registers each GAP, UI element and web service parameters required by the composite web service (Act 1208). The operator interacts with the registered GAPs, UI elements and web service parameters through the design tool's GUI Interface (Act 1210). The design tool captures the structural representation of GUIs of a GAP and UI elements of the GAP through the accessibility layer as a result of the operator interactions with the registered GAPs and UI elements (Act 1212). The design tool may translate the GAP and UI elements actions resulting from the operator interactions into executable instructions for the composite web service (Act 1214). The design tool, through the accessibility layer, records the structures of the GAP screens and operator actions on the GAPs to intercept user-level events (e.g., operator interactions with the GAP and UI elements) (Act 1216). The design tool stores the structural representation of GUIs of a GAP and UI elements of the GAP for use operationally after generating and publishing the composite web service (Act 1218).

Figure 13:
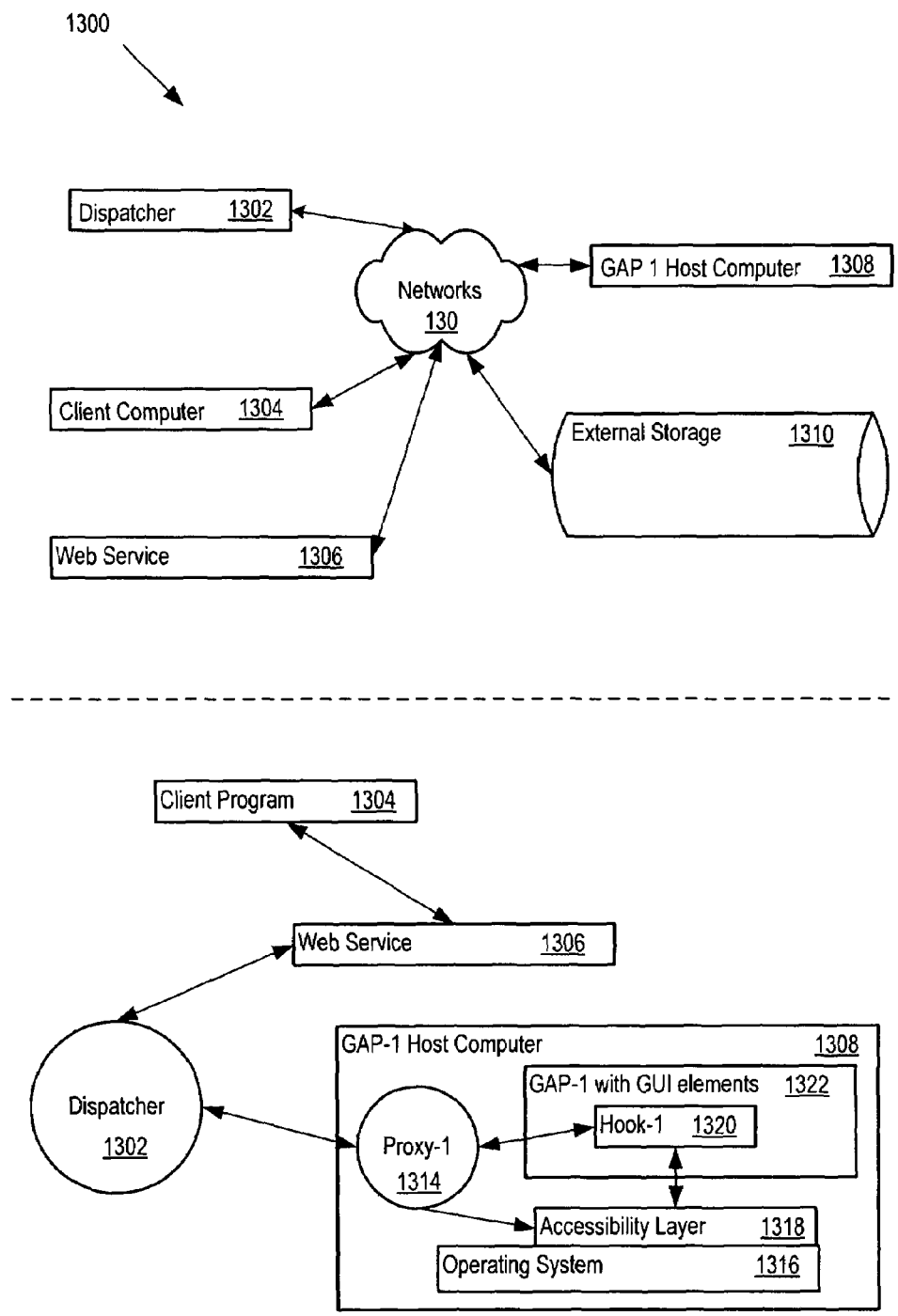
FIG. 13 shows a web service creation tool.

FIG. 13 shows a web service creation tool 1300. In FIG. 13, the web service creation tool 1300 may include a dispatcher 1302, a client program 1304, a web service 1306, a GAP 1 host computer 1308, and external storage 1310. The web service creation tool 1300 components may communicate through the networks 130 (e.g., the Internet). FIG. 13 also shows the dispatcher 1302 coordinating communication between a single web service 1306 and proxy-1 1314. The dispatcher 1302 acts as an intermediary that enables web services and GAPs to run on separate computers while presenting a common view to client programs 1304. In one implementation of the web service creation tool 1300, when a client program 1304 invokes a web service method corresponding to web service 1306, the web service 1306 sends a web service request to the dispatcher 1302. The dispatcher 1302 may route the web service request to proxy-1 1314 based on GAP identification data and GAP information collected from the proxy-1 1314. The GAP-1 host computer 1308 runs an operating system 1316, provides an accessibility layer 1318, and hosts the proxy-1 1314, the hook-1 1320 and GAP-1 with GUI elements 1322. The operating system 1316 may provide the accessibility layer 1318 with an accessibility API. The proxy-1 1314 registers with the dispatcher 1302 under a unique name, collects GAP identification data and information about the GAP-1 with GUI elements 1322 running with the proxy-1 1314 on the GAP-1 host computer 1308, and sends the GAP identification data and information to the dispatcher 102. In one implementation, when proxy-1 1322 receives a web service request, the proxy-1 1322 interacts with one or more UI elements of the GAP-1 with UI elements 1322 through the hook-1 1320, in response to the web service request. The accessibility layer 1318 may support hook-1 1320 to monitor and control execution of GAP-1 with UI elements 1322, and perform various actions on GAP-1 with UI elements 1322 programmatically.

Figure 14:
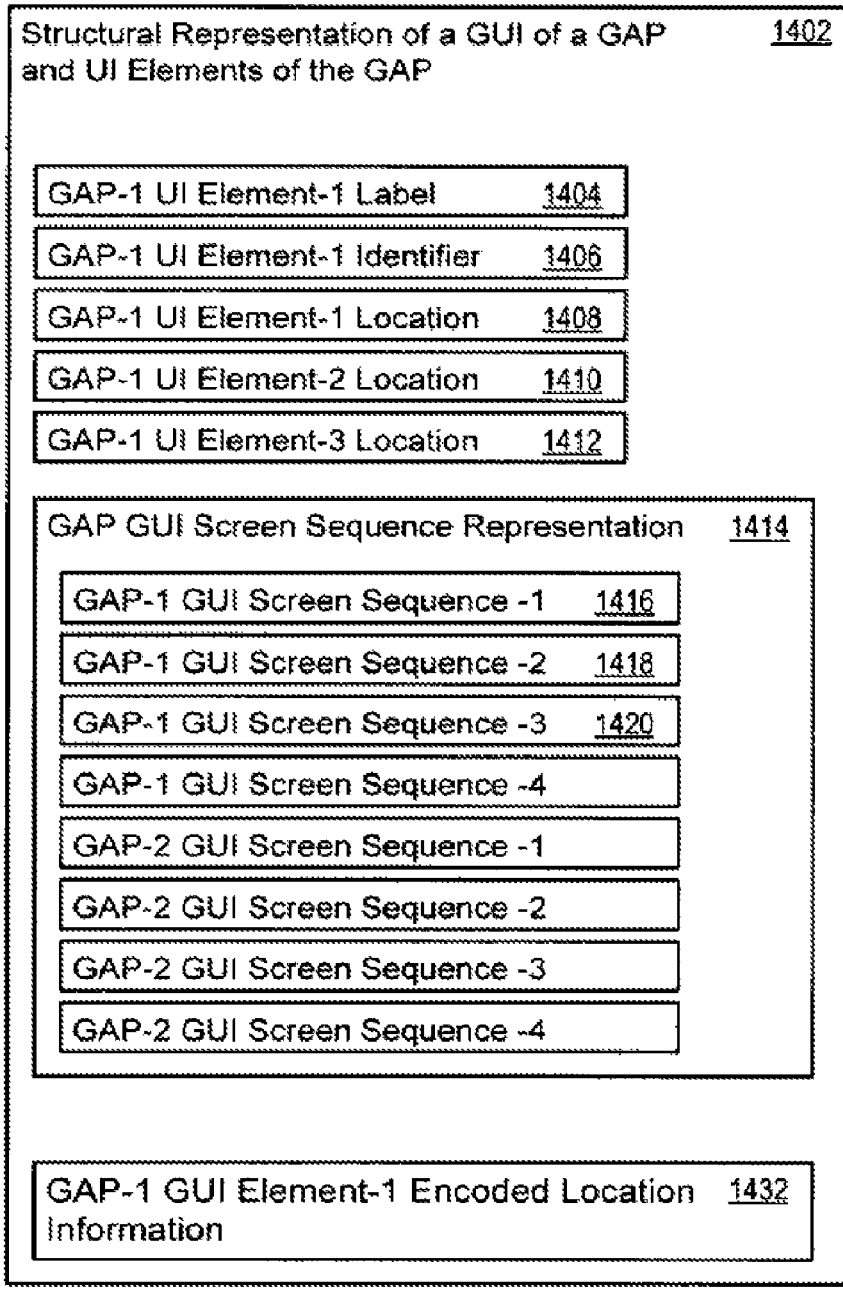
FIG. 14 shows a structural representation of a GUI of a GAP and UI elements of the GAP.

FIG. 14 shows a structural representation of a GUI of a GAP and UI elements of the GAP. The structural representation of a GUI of a GAP and UI elements of the GAP 1402 may include: a GAP-1 UI element-1 label 1404, a GAP-1 UI element-1 Identifier 1406, location information in the GAP GUI for the GAP UI elements (e.g., GAP-1 UI element-1 location 1408, GAP-1 UI element-2 location 1410, and GAP-1 UI element-3 location 1412); and a GAP GUI screen sequence Representation 1414 for each GAP GUI Screen sequence. The structural representation of GUIs of a GAP and UI elements of the GAP 1402 may represent multiple GAP-1 GUI Screens (e.g., GAP-1 GUI screen sequence-1 1416, GAP-1 GUI screen sequence-2 1418, and GAP-1 GUI screen sequence-3 1420), and encode location information for the GAP-1 with UI elements 1322 (e.g., GAP-1 GUI element-1 encoded location information 1432).

Figure 15:
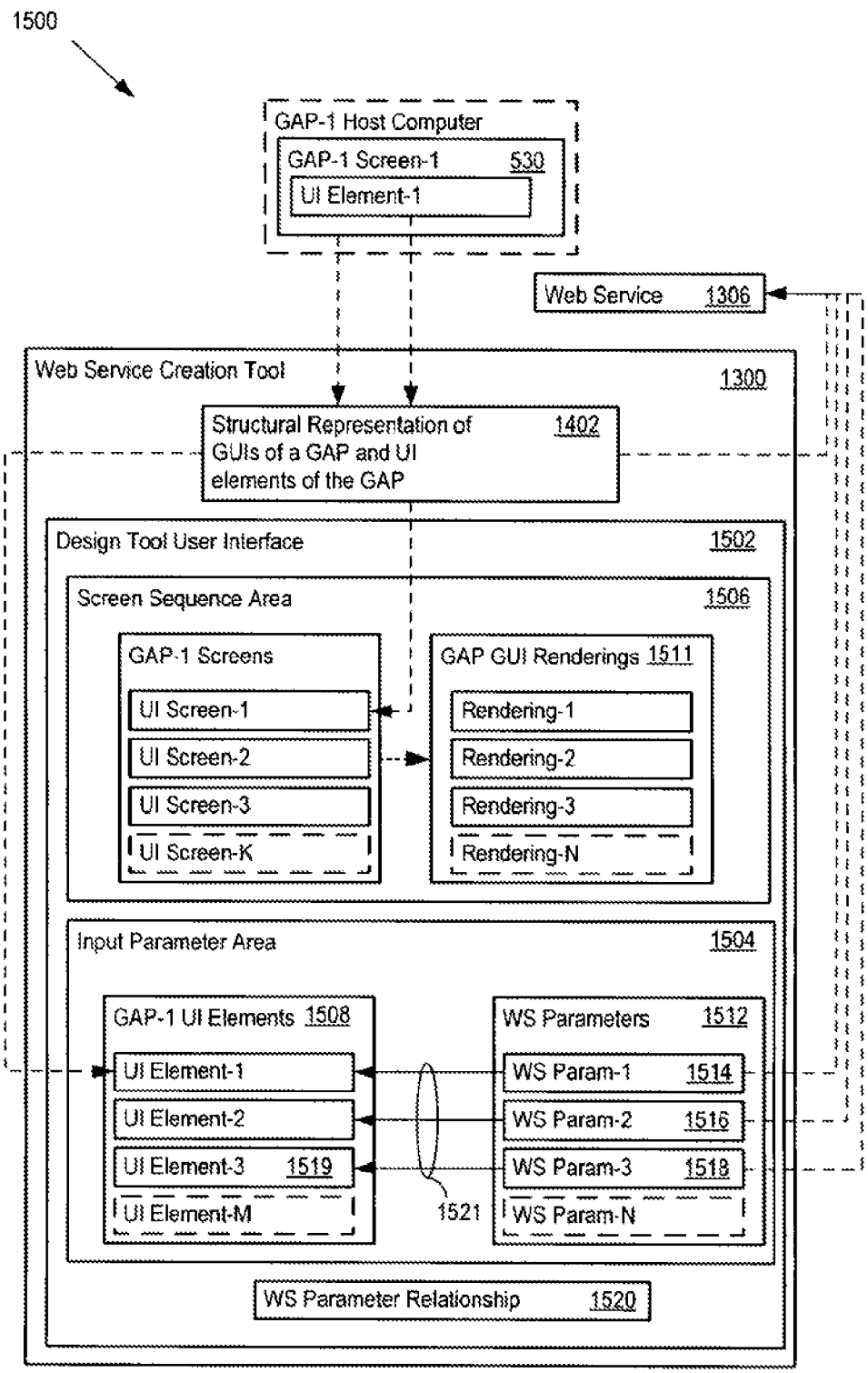
FIG. 15 shows a design tool user interface for a web service creation tool.

FIG. 15 shows a design tool user interface for a web service creation tool. The design tool user interface 1502 may include an input parameter area 1504 and a screen sequence area 1506. The design tool user interface 1502 may include a drag-and-drop interface used to move GAP-1 UI elements 1508 and GAP GUI Screens represented in the structural representation of GUIs of a GAP and UI elements of the GAP 1402 into the input parameter area 1504 and screen sequence area 1506. The design tool user interface 1502 may consider the act of moving GAP-1 UI elements 1508 and GAP GUI Screens represented in the structural representation of GUIs of a GAP and UI elements of the GAP 1402 into the input parameter area 1504 and screen sequence area 1506 as adding objects to or registering objects with the web service definition 1510. The design tool user interface 1502 may highlight a GAP-1 GUI element in the GAP-1 GUI, add the GAP-1 GUI element to the web service definition 1510 or move the GAP-1 GUI element the input parameter area 1504, in response to an operator's selection of a GAP-1 UI element or a GAP GUI Screen represented in the structural representation of GUIs of a GAP and UI elements of the GAP 1402. The web service creation tool 1300 may include a GAP GUI rendering 1511 of a GAP GUI screen sequence illustrating traversal through multiple GAP GUI Screens, and at least one of the web service parameters 1512 (e.g., WS parameter-1 1514, WS parameter-2 1516, and WS parameter-3 1518) for the web service 1306. The design tool user interface 1502 may create a web service parameter relationship 1520 between at least one of the web service parameters 1512 and at least one of the GAP-1 UI elements 1508, and generate the web service 1306 based on the web service definition 1510 and the web service parameter relationship 1520. For example, FIG. 15 shows an arrow 1521 drawn (e.g., by an operator or from input from an automated analysis tool) from WS parameter-3 1518 to GAP-2 UI element-3 1519, which establishes a web service parameter relationship 1520 between a web service parameter and GAP UI element. The design tool user interface 1502 may create additional web service parameter relationships 1512 between the web service 1306 and additional GAP-1 UI elements 1508 as a result of adding the additional GAP-1 UI elements 1508 to the input parameter area 1504. The design tool user interface 1502 may use the accessibility layer 1318 to support the hook-1 1320 to monitor execution of GAP-1 with UI elements 1322, and GAP-1 UI elements 1508 through multiple GAP GUI Screens, and capture the structural representation of GUIs of a GAP and UI elements of the GAP 1402.

Figure 16:
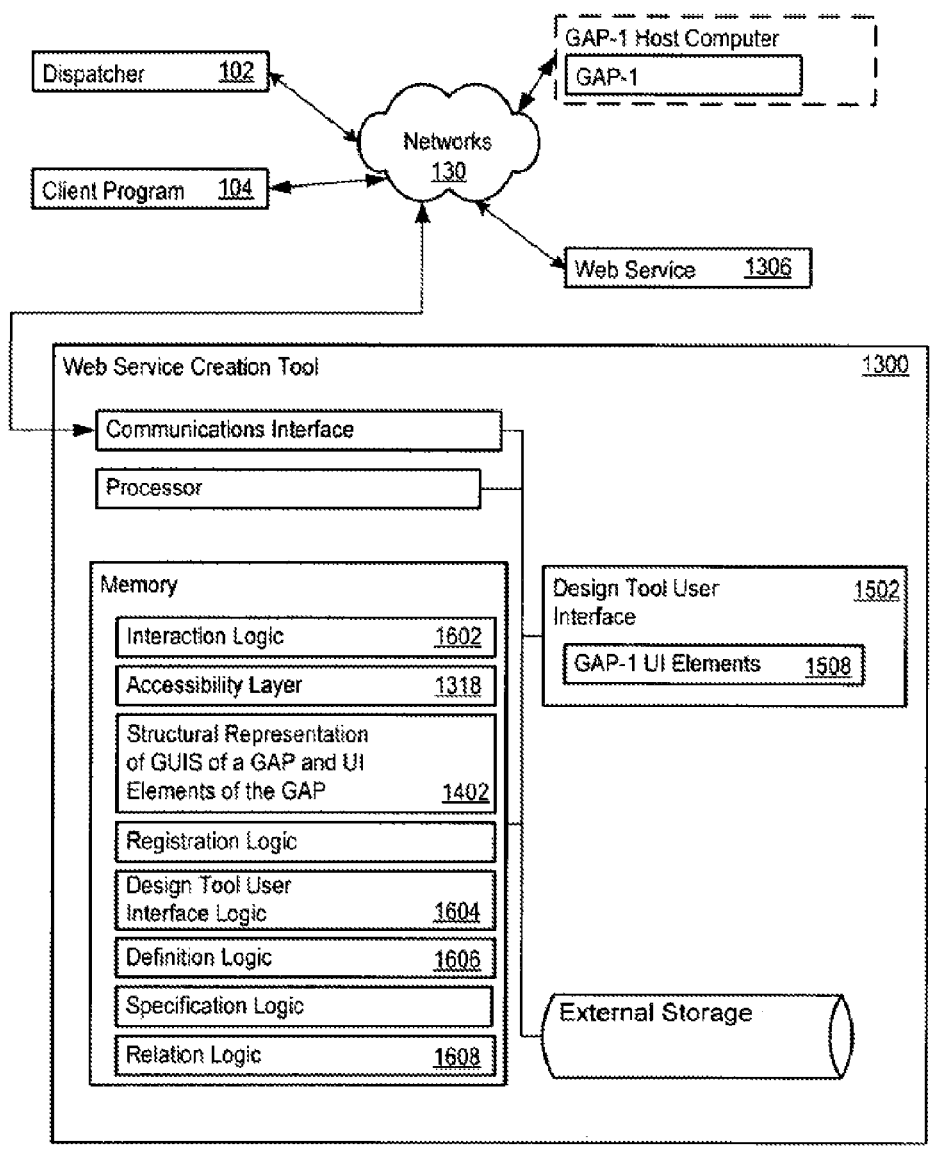
FIG. 16 shows one example implementation of the web service creation tool.

FIG. 16 shows one example implementation of the web service creation tool. The web service creation tool 1300 may include Interaction logic 1602, design tool user interface logic 1604, definition logic 1606, and relation logic 1608. The Interaction logic 1602 may use the accessibility layer 1318 to capture the structural representation of GUIs of a GAP and UI elements of the GAP 1402. The Interaction logic 1602 may monitor operator interactions with GAP-1 through multiple GAP-1 GUI Screens and GAP UI elements 1508, and establish the structural representation of GUIs of a GAP and UI elements of the GAP 1402 across multiple GAP-1 GUI Screens. The Interaction logic 1602 may also obtain location information and identification information for multiple GAP-1 UI elements 1508, and record the location information and the identification information in the structural representation of GUIs of a GAP and UI elements of the GAP 1402.

The design tool user interface logic 1604 may generate the design tool user interface 1502 that includes the input parameter area 1504 and a screen sequence area 1506, monitor and determine an operator's selection of at least one of the GAP-1 UI elements 1508 in the GAP GUI represented in the structural representation of GUIs of a GAP and UI elements of the GAP 1402, and add the selected GAP-1 UI elements 1508 to the input parameter area 1504. The definition logic 1526 may establish the web service definition with at least one of the web service parameters 1512 (e.g., WS parameter-1 1514, WS parameter-2 1516, and WS parameter-3 1518) that will interact with the at least one of the GAP-1 UI elements 1508. The relation logic 1608 may establish a web service parameter relationship 1520 between at least one of the web service parameters 1512 (e.g., WS parameter-1 1514, WS parameter-2 1516, and WS parameter-3 1518) and at least one of the GAP-1 UI elements 1508. The relations logic 1608 may establish multiple web service parameter relationships 1520 with multiple web service parameters 1512 (e.g., WS parameter-1 1514, WS parameter-2 1516, and WS parameter-3 1518) and each of the GAP-1 UI elements 1508.

Figure 17:
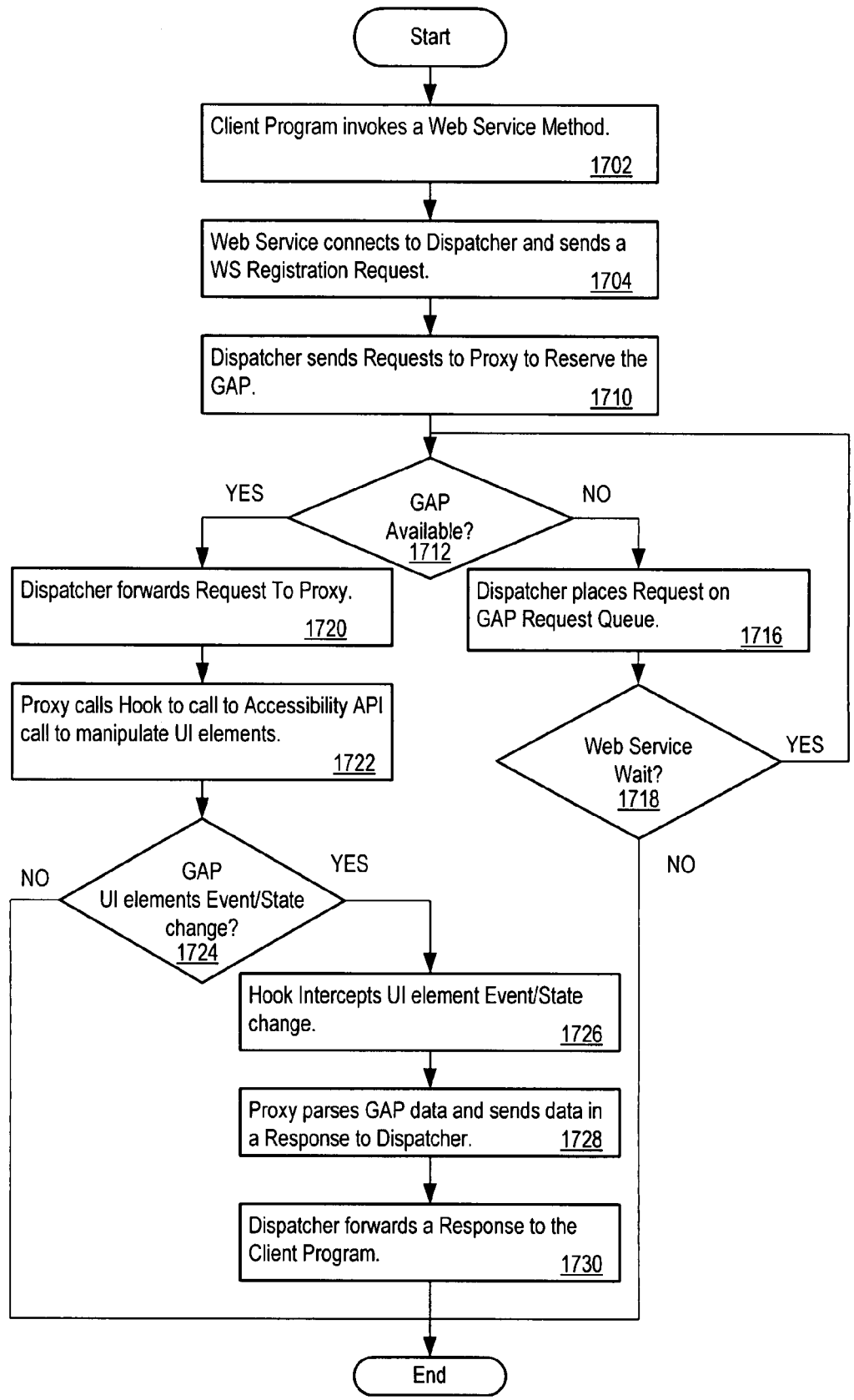
FIG. 17 shows the acts that a proxy and dispatcher may take in a web service creation tool.

FIG. 17 shows the acts that a proxy and dispatcher may take in a web service creation tool. When a client program invokes a method of a web service (Act 1702), the requesting web service (e.g., web service 204) to which the method belongs connects to the dispatcher 102, and sends a web services registration request 428 (Act 1704). The dispatcher 102 may determine from the web service registration request 428 and analyze the GAP Table received from connected proxy the identity of the GAP required to fulfil the web service method, and send web service requests to the proxy to reserve the GAP (Act 1710). Web service requests may include GAP identification data and information about the required GAP, the GAP UI elements, requested actions to perform on the GAP and UI elements, and the information to return to the requesting web service. The dispatcher 102 and proxy corresponding to the required GAP may communicate to determine the availability of the GAP (Act 1712). For an unavailable GAP, the dispatcher 102 may place the web service request on the dispatchers GAP request queue and notifies the requesting web service or composite web service (e.g., web service 204) (Act 1716). The requesting web service may determine whether to wait for the unavailable GAP to change status to available (Act 1718). For an available GAP, the dispatcher may forward the web service request to the proxy (Act 1720). The proxy for the required GAP may command and control the GAP and UI elements according to the web service request, and return responses to the dispatcher 102 (Act 1722). The hook monitors the GAP and UI elements for event and state changes (Act 1724). When a GAP or UI element event or state changes the hook intercepts the event or state change, and forwards GAP and UI element event and state change information to the controlling proxy (Act 1726). The proxy parses GAP and UI element data, and prepares and sends information in a response to the dispatcher (Act 1728). The dispatcher forwards the response to the client program (Act 1730).

Figure 18:
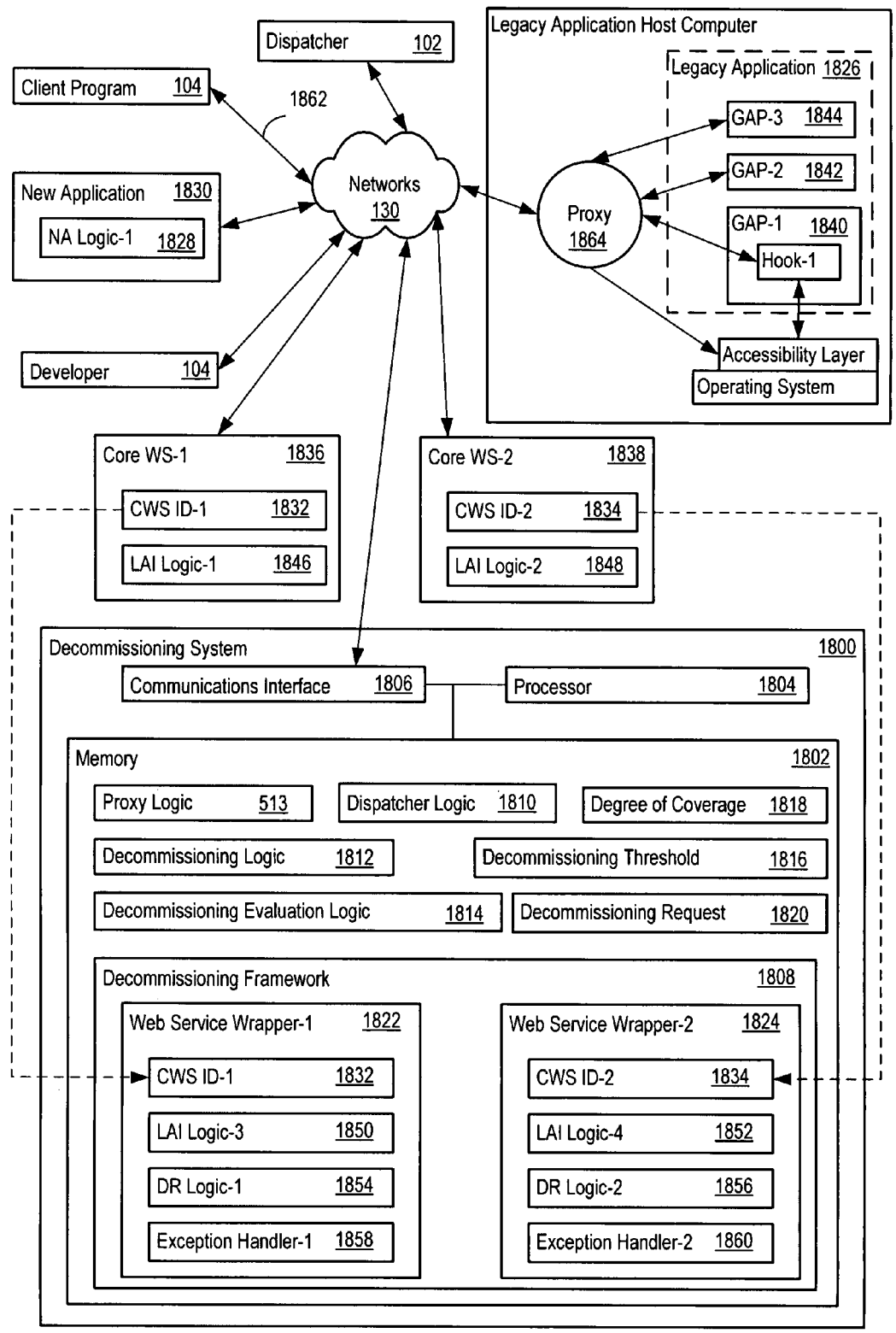
FIG. 18 illustrates a decommissioning system.

FIG. 18 illustrates a decommissioning system 1800. The decommissioning system 1800 may include a memory 1802, a processor 1804, and a communications interface 1806. The memory 1802 of the decommissioning system 1800 may include a decommissioning framework 1808, dispatcher logic 1810, and proxy logic 513. The memory 1802 may also include decommissioning evaluation logic 1814, a decommissioning threshold 1816, a degree of coverage 1818, and a decommissioning request 1820. In one implementation, the decommissioning framework 1808 includes web service wrapper-1 1822 and web service wrapper-2 1824 used to decommission a legacy application 1826 and to migrate functionality to new application (NA) logic-1 1828 implemented in a new application 1830.

In one implementation, the web service wrapper-1 1822 and web service wrapper-2 1824 include core web service (CWS) identifiers (ID)-1 1832 and CWS ID-2 1834, respectively, corresponding to core web services (WS)-1 1836 and core WS-2 1838. Core WS-1 1836 and core WS-2 1838 invoke GAP-1 1840, GAP-2 1842, and GAP-3 1844 using legacy application invocation (LAI) logic-1 1846 and LAI logic-2 1848. The web service wrapper-1 1822 and web service wrapper-2 1824 include LAI logic-3 1850 and LAI logic-4 1852, respectively, and decommissioning replacement (DR) logic-1 1854 and DR logic-2 1856, and exception handler-1 1858 and exception handler-2 1860.

In one implementation, the decommissioning framework 1808 uses the web service wrapper-1 1822 to replace the core WS-1 1836 so that the client program 104 directs service requests to the web service wrapper-1 1822 and LAI logic-3 1850 executes instead of LAI logic-1 1846. The DR logic-1 1854 may be introduced into the web service wrapper-1 1822 to replace portions and/or all of the LAI logic-3 1850 so that the web service wrapper-1 1822 invokes GAP-1 1840, a combination of the GAP-1 1840 and the new application (NA) logic-1 1828, or the NA logic 1828 only. The combinations of DR logic and LAI logic implemented in the decommissioning framework 1808 will be presented in further detail below.

In one implementation, the decommissioning logic 1812 identifies DR logic-1 1854 and DR logic-2 1856 for GAP-1 1840, GAP-2 1842, and GAP-3 1844 that the decommissioning system 1800 uses to decommission the legacy application 1826. The decommissioning logic 1812 builds web service wrapper-1 1822 and web service wrapper-2 1824 that include the CWS ID-1 1832 and CWS ID-2 1834 from core WS-1 1836 and core WS-2 1838 and inserts DR logic-1 1854 and DR logic-2 1856 into web service wrapper-1 1822 and web service wrapper-2 1824, respectively, to establish the decommissioning framework 1800 for the legacy application 1826. The decommissioning system 1800 may coordinate communication with the legacy application 1826, new application 1830, core WS-1 1836 and core WS-2 1838, web service wrapper-1 1822 and web service wrapper-2 1824, dispatcher logic 1812, and proxy logic 1814 through the communications interface 1806 to process service requests 1862 from the client program 104.

In one implementation, the dispatcher logic 1812 and proxy logic 1814 coordinate communication between core WS-1 1836, core WS-2 1838, web service wrapper-1 1822, web service wrapper-2 1824, and legacy application 1826. The dispatcher logic 1812 and proxy logic 1814 communicate with the dispatcher 102 and proxy 1864, respectively, where the dispatcher 102 operates as a central point for coordinating proxies (e.g., proxy 1864) in a distributed environment. For example, proxy 1864 registers with the dispatcher 102, collects information about GAP-1 1840, GAP-2 1842, and GAP-3 1844 running with the proxy 1864, and sends the information to the dispatcher 102. The dispatcher 102 uses the information from the proxy 1864 to route service requests from the client program 104, core WS-1 1836 and core WS-2 1838, and web service wrapper-1 1822 and web service wrapper-2 1824 to the proxy 1864. In one implementation, the decommissioning logic 1812 builds the decommissioning framework 1808 with web service wrapper-1 1822 and web service wrapper-2 1824 using information received via communication with the dispatcher logic 1810 and proxy logic 513. Web service wrapper-1 1822 and web service wrapper-2 1824 may use LAI logic-3 1850 and LAI logic-4 1852 to communicate with the dispatcher 102 and/or proxy 1864. In one implementation, LAI logic-1 1846 and LAI logic-2 1848, and LAI logic-3 1850 and LAI logic-4 1852 communicate with the dispatcher 102 and/or proxy 1864 through the dispatcher logic 1810 and proxy logic 513, respectively.

In one implementation, the decommissioning threshold 1816 represents an amount (e.g., a percent) of functionality coverage the developer desires the decommissioning framework 1808 to provide before the legacy application 1826 is decommissioned. The decommissioning evaluation logic 1814 evaluates the degree of coverage 1818 the decommissioning framework 1808 provides to determine whether the degree of coverage 1818 meets the decommissioning threshold 1816. The developer may assign weights to features (e.g., legacy application logic) that the decommissioning evaluation logic 1814 uses to determine whether the degree of coverage 1818 meets the decommissioning threshold 1816. For example, a developer may assign legacy application logic a weight from 1 to 10, where a weight of 10 indicates a critical feature and a weight of 1 indicates an optional and/or non-critical feature. The degree of coverage 1818 may meet the decommissioning threshold 1816 when a selected subset, or all of, the features assigned a specific weight or weights (e.g., a weight of 10 or weights above 7) have been implemented by the decommissioning framework 1808. As another example, the degree of coverage 1818 may meet the decommissioning threshold 1816 when the sum of the weights for features implemented in the decommissioning framework 1808 exceeds the value set as the decommissioning threshold 1816. The decommissioning may be qualitative and/or quantitative in nature.

In one implementation, the decommissioning evaluation logic 1814 sends a decommissioning request 1820 when the degree of coverage 1818 meets the decommissioning threshold 1816. The decommissioning request 1820 may take many forms, such as an email, voice, or instant message to a developer, manager, or other authority. The decommissioning request 1820 may also take the form of an interprocess request, signal, or other message to an automated process (e.g., an operating system) that deactivates, terminates, or otherwise decommissions the legacy application 1826. In response to meeting the decommissioning threshold 1816, the decommissioning system 1800 may automatically implement default DR logic-1 1854 and DR logic-2 1856 for functionality of the legacy application 1826 not already covered by the decommissioning framework 1808.

For example, where the developer sets the decommissioning threshold 1816 to 50% and the decommissioning evaluation logic 1814 evaluates the degree of coverage 1818 to indicate that the decommissioning framework 1808 provides 66% of the legacy application logic (e.g., GAP-1 1840, and GAP-2 1842) through web service wrapper-1 1822, the decommissioning evaluation logic 1814 sends the developer a decommissioning request 1820 because the degree of coverage 1818 meets the decommissioning threshold 1816. The degree of coverage 1818, for example, represents coverage for GAP-1 1840 and GAP-2 1842. The decommissioning evaluation logic 1814 automatically implements DR logic-2 1856 for functionality of the legacy application 1826 not represented by the degree of coverage 1818 (e.g., GAP-3 1844). The automatically implemented DR logic-2 1856 may provide default processing, error handling, or other response to substitute for the remaining functionality not actually implemented by replacement logic.

Table 1 shows a core web service with a method submitExpense that accepts input parameters used to submit expenses and includes legacy application invocation logic that interacts with a GAP used to insert expense information into a legacy application. The executor shown in Table 1 may be configured to represent the legacy application invocation logic based on the values given the host and port variables indicating the legacy application logic to invoke.

TABLE 1

Core Web Service

```
public void submitExpense(String amount, String city, String date,
String description, String expense, String merchant,
String paymentMethod)
throws java.rmi.RemoteException {
try {
// make a new service executor ServiceExecutor
executor = new ServiceExecutor( );
// get the velocity template
String fileName = "resources/templates/CorewebServiceState.xml.vm";
    InputStream stream =
getClass( ).getClassLoader( ).getResourceAsStream(fileName);
    // build a map of parameters
    Map<String, String> parameters = new TreeMap<String, String>( );
        parameters.put("amount", amount);
        parameters.put("city", city);
        parameters.put("date", date);
        parameters.put("description", description);
        parameters.put("expense", expense);
        parameters.put("merchant", merchant);
        parameters.put("paymentMethod", paymentMethod);
    // get the host and port to connect to the Legacy Application
        String host = LegacyApplicationHost ...;
int port = LegacyApplicationPort ...;
    // pass the template and parameter map to the executor - LAI Logic
    executor.executeOperation(fileName, parameters, host, port);
} catch (Throwable t) {
throw new java.rmi.RemoteException(message + "Unable to perform
method \"submitExpense\" related to Legacy Application processing
due to:", t);
}
}
```

Table 2 shows a web service wrapper that includes decommissioning replacement logic. A web service wrapper may combine the Table 1 and Table 2 logic to implement a web service wrapper that includes LAI logic and DR logic. Accordingly, a single web service wrapper may replace any one or more core web services or any amount of legacy functionality. There need not be a one-to-one correspondence between web service wrappers and core web services, and the wrappers may implement any distribution of logic.

TABLE 2

Web Service Wrapper public void submitExpense(String amount, String city, String date,
String description, String expense, String merchant,
String paymentMethod)
throw new java.rmi.RemoteException {
try {
// Decommissioning Replacement Logic
String fileName = new
"resources/templates/webServiceWrapperState.xml.vm";
    InputStream stream =
getClass( ).getClassLoader( ).getResourceAsStream(fileName);
    // build a map of parameters
    Map<String, String> parameters = new TreeMap<String, String>( );
        parameters.put("amount", amount);
        parameters.put("city", city);
        parameters.put("date", date);
        parameters.put("description", description);
        parameters.put("expense", expense);
        parameters.put("merchant", merchant);
        parameters.put("paymentMethod", paymentMethod);
// Decommissioning Replacement Logic calculates a merchant code,
//   a new expense calculation, and a new payment method
String merchantcode = new ...;
        parameters.put("merchantcode", merchantcode);
String NewExpenseCalculation = new ...;
        parameters.put("NewExpenseCalculation", NewExpenseCalculation);
String NewPaymentMethod = new ...;
        parameters.put("New payment method", NewPaymentMethod);
    // get the host and port to connect to new application
        String host = new NewApplicationHost ...;
int port = new NewApplicationPort ...;
    // pass the template and parameter map to the executor directed to new
application
        executor.executeOperation(fileName, parameters, host, port);
} catch (Throwable t) }
throw new java.rmi.RemoteException(message + "Unable to perform
method \"submitExpense\" related to New Application processing
due to:", t);
    }
}

Figure 19:
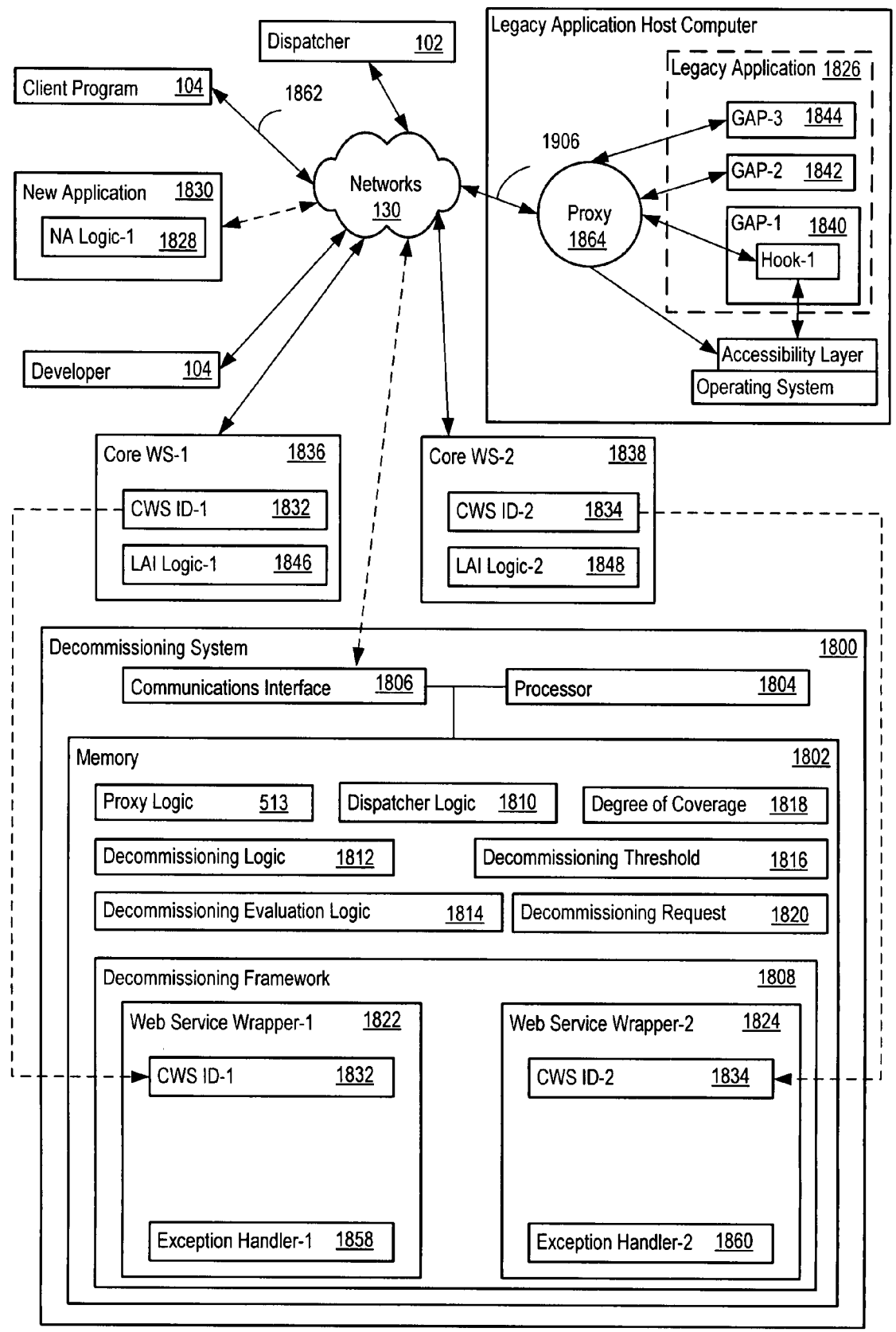
FIG. 19 shows multiple core web services in communication with a legacy application.

FIG. 19 shows core WS-1 1836 and core WS-2 1838 in communication with a legacy application 1826. In one implementation, a user interacts through the client program 104 with core WS-1 1836 and core WS-2 1838 that invoke GAP-1 1840, GAP-2 1842 and GAP-3 1844 using LAI logic-1 1846 and LAI logic-2 1848. The dispatcher 102 routes service requests 1906 to a proxy 1864 from core WS-1 1836 and core WS-2 1838. FIG. 19 shows the processing environment prior to the decommissioning logic 1812 replacing any of the legacy application 1826 logic with decommissioning replacement logic and/or LAI logic implemented in a web service wrapper. Thus, the new application 1830 continues to function independently of the core web service and accordingly, without interaction with the legacy application 1826 logic and/or functionality.

Figure 20:
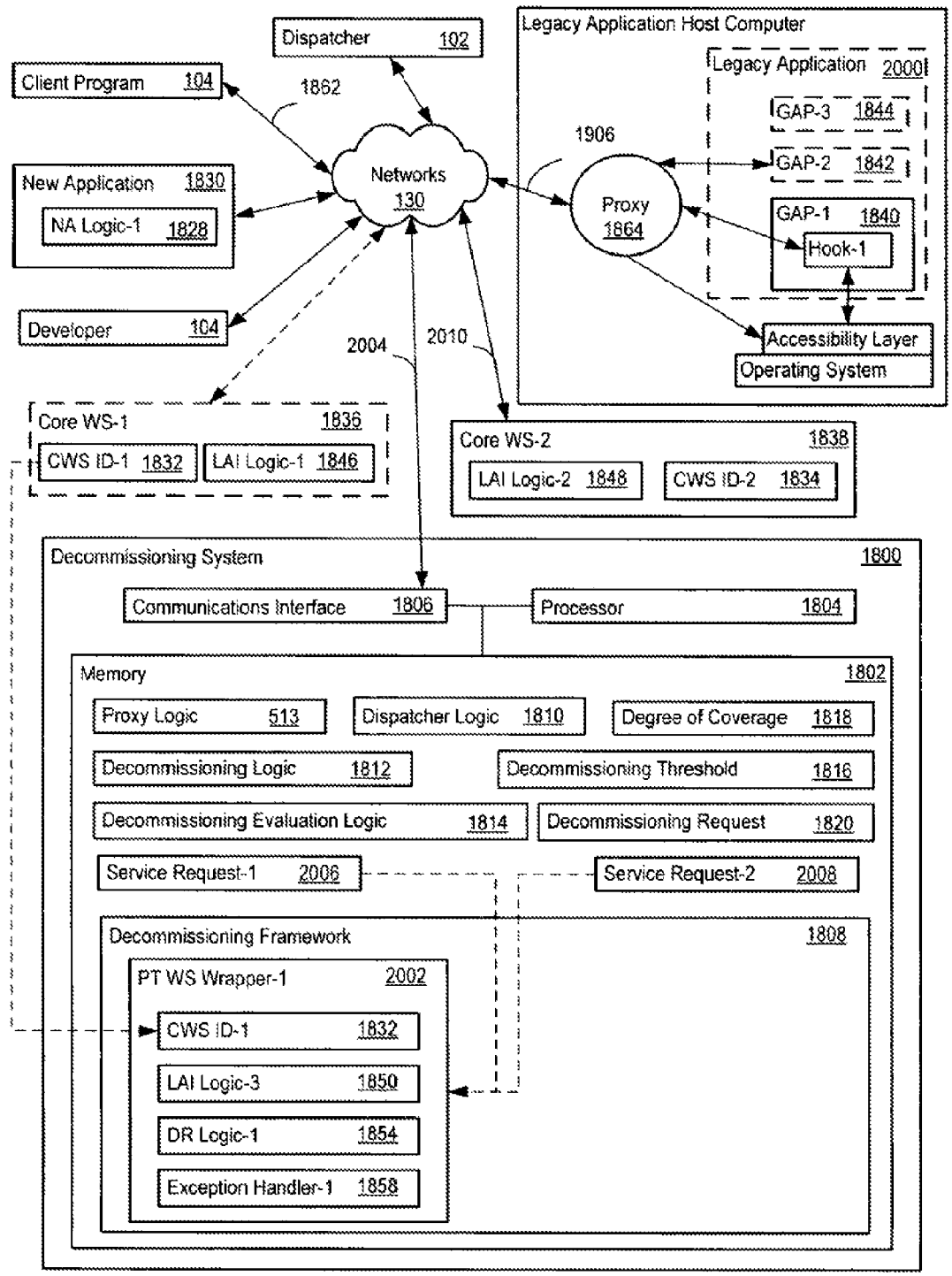
FIG. 20 shows a partially decommissioned legacy application.

FIG. 20 shows a partially decommissioned legacy application 2000. In the example shown in FIG. 20, the decommissioning logic 1812 builds a partially transitioned (PT) web service wrapper-1 2002 to establish the decommissioning framework 1808 and replaces core WS-1 1836 that previously invoked GAP-2 1842 and GAP-3 1844. Core WS-2 1838 includes LAI logic-2 1848 that invokes GAP-1 1840. The PT web service wrapper-1 2002 may receive service requests 1862 from the client program 104 for GAP-2 1842 functionality as service request-1 2006 and service request-2 2008. The PT web service wrapper-1 2002 may use LAI logic-3 1850 to invoke GAP-3 1844 functionality and DR logic-1 1854 to invoke the NA logic 1828 in the new application 1830. The PT web service wrapper-1 2002 and core WS-2 1838 route service requests 2004 and 2010, respectively, to dispatcher 102 which routes service requests as appropriate to proxy 1864. The decommissioning system 1800, shown in FIG. 20, transparently provides the client program 104 a combination of functionality from the partially decommissioned legacy application 2000 and NA logic 1828. The decommissioning logic 1812 records the implementation of the functionality of GAP-2 1842 and GAP-3 1844 in the decommissioning framework 1808. The decommissioning evaluation logic 1814 determines that the degree of coverage 1818 includes GAP-2 1842 and GAP-3 1844, and equals 66%.

Figure 21:
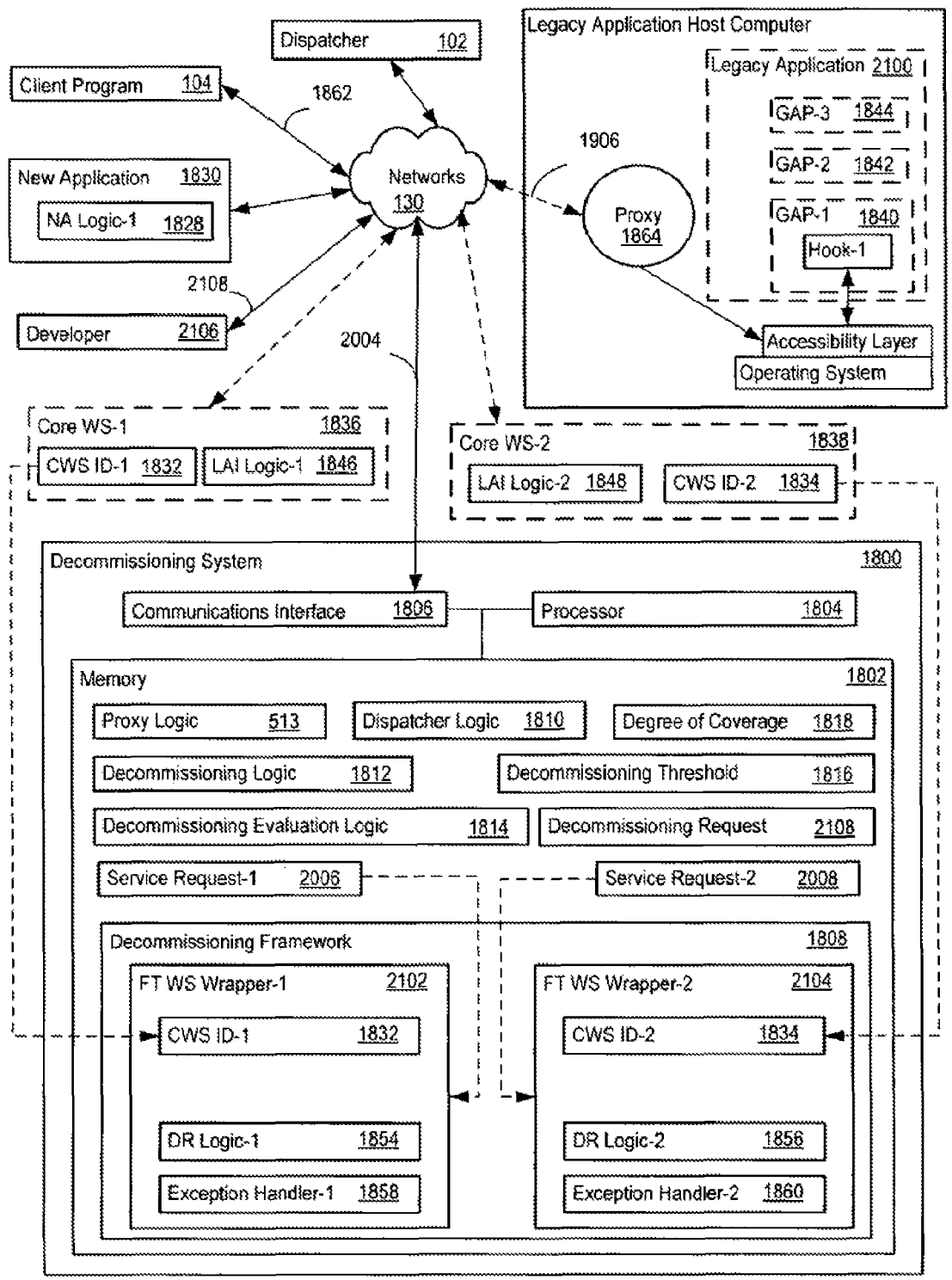
FIG. 21 shows a fully decommissioned legacy application.

FIG. 21 shows a fully decommissioned legacy application 2100. In the example shown in FIG. 21, the decommissioning logic 1812 builds a fully transitioned (FT) web service wrapper-1 2102 and FT web service wrapper-2 2104 to establish the decommissioning framework 1808. The decommissioning framework 1808 replaces the legacy application logic GAP-1 1840, GAP-2 1842, and GAP-1 1843. FT web service wrapper-1 2102 and FT web service wrapper-2 2104 receive service requests 1862 from the client program 104 for GAP-1 1840, GAP-2 1842, and GAP-1 1843 functionality as service request-1 2006 and service request-2 2008. FT web service wrapper-1 2102 and FT web service wrapper-2 2104 use DR logic-1 1854 and DR logic-2 1856 to invoke the NA logic 1828 in the new application 1830. In one implementation, FT web service wrapper-1 2102 and FT web service wrapper-2 2104 direct service requests 2004 to the dispatcher 102 to route to the new application 1830 and NA logic 1828. The dispatcher 102 does not route service requests 1906 to the fully decommissioned legacy application 2100. The decommissioning system 1800, shown in FIG. 21, transparently provides the client program 104 the functionality of the NA logic 1828 as a substitute for the fully decommissioned legacy application 2100. The decommissioning evaluation logic 1814 determines the degree of coverage 1818 to meet the decommissioning threshold 1816 and sends the developer 2106 a decommissioning request 2108 to indicate that the fully decommissioned legacy application 2100 may be decommissioned.

Figure 22:
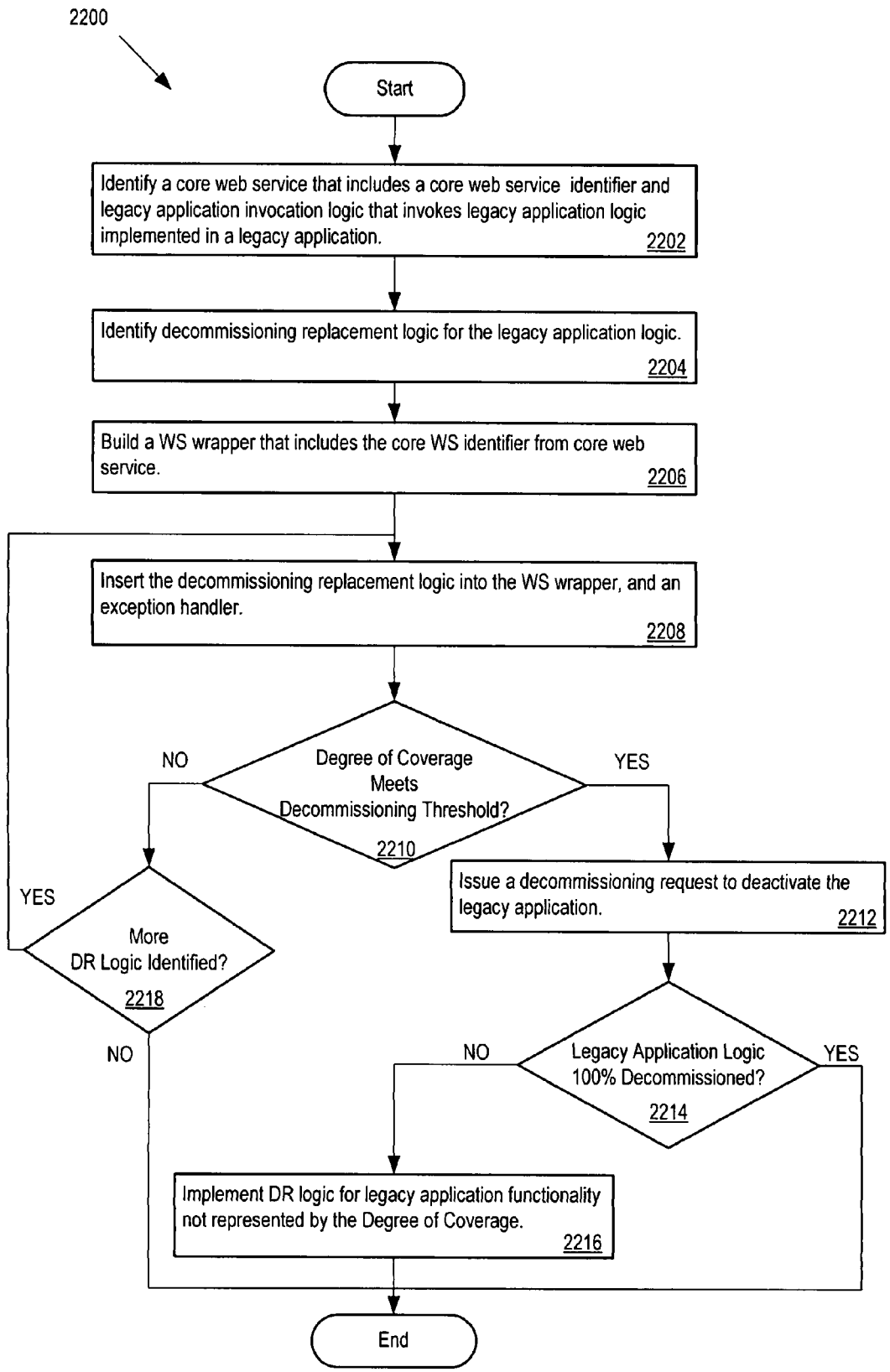
FIG. 22 shows an example of the processing that the decommissioning logic and decommissioning evaluation logic perform.

FIG. 22 shows an example of the processing that the decommissioning logic 1812 and decommissioning evaluation logic 1814 perform. In one implementation, the decommissioning logic 1812 identifies core WS-1 1836 that includes CWS ID-1 1832 that invokes legacy application logic implemented in GAP-2 1842 and GAP-3 1844 (2202). The decommissioning logic 1812 identifies DR logic-1 1854 for GAP-2 1842 and GAP-3 1844 (2204) that the decommissioning system 1800 may use to decommission GAP-2 1842 and GAP-3 1844. The decommissioning logic 1812 builds web service wrapper-1 1822 that includes the CWS ID-1 1832 from the core WS-1 1836 (2206). The decommissioning logic 1812 inserts DR logic-1 1854 into web service wrapper-1 1822, an exception handler-1 1858 that replaces the legacy application logic GAP-2 1842 and GAP-3 1844 (2208) to establish a decommissioning framework 1808 for the legacy application 1826.

FIG. 22 further illustrates that the decommissioning evaluation logic 1814 may analyze the decommissioning framework 1808 to determine the degree of coverage 1818 provided by the decommissioning framework 1808 for the desired functionality originally provided by the legacy application

1826. For example, the decommissioning framework 1808 may provide 1 of 10 functions provided by the legacy application 1826 identified for decommissioning, resulting in a 10% degree of coverage 1818. On the other hand, the decommissioning framework 1808 may provide 10 of 10 functionalities of the legacy application 1826 identified for decommissioning, resulting in a 100% degree of coverage 1818.

The decommissioning evaluation logic 1814 may compare the degree of coverage 1818 to the decommissioning threshold 1816 (2210) and issue a decommissioning request to deactivate the legacy application when the degree of coverage meets the decommissioning threshold (2212). The decommissioning threshold 1816 indicates the percent of functionality coverage the developer desires the decommissioning framework 1808 to provide before a legacy application 1826 may be decommissioned. For example, the decommissioning threshold 1816 may be set to 50% so that when 5 of the 10 functionality identified for decommissioning have been implemented in the decommissioning framework 1808 the decommissioning evaluation logic 1814 may issue a decommissioning request 1820. The decommissioning request 1820 may indicate a flag or other indicator that provides the developer information regarding outstanding tasks to complete and/or optional functionality that the developer may decide to decommission without migrating to the new application 1830 before fully decommissioning the legacy application 1826.

The decommissioning evaluation logic 1814 may further evaluate whether the decommissioning framework 1808 has decommissioned 100% of the legacy application 1826 functionality (2214) when the degree of coverage meets the decommissioning threshold and automatically implement additional decommissioning replacement logic for legacy application 1826 functionality not represented by the degree of coverage 1818 (2216). In other words, when the decommissioning framework 1808 meets the decommissioning threshold but decommissions less than 100% of the legacy application logic, the decommissioning evaluation logic 1814 may automatically implement additional decommissioning replacement logic so that the legacy application 1826 can be fully decommissioned. The automatically implemented decommissioning replacement logic may provide default processing, error handling, or other responses to substitute for the remaining legacy application 1826 functionality not covered by the degree of coverage 1818.

The decommissioning logic 1812 may identify additional decommissioning replacement logic to include in the decommissioning framework 1808 (2218) either inserting the decommissioning replacement logic into an existing web service wrapper or implementing a new web service wrapper. The decommissioning evaluation logic 1814 may evaluate the degree of coverage 1818 when the decommissioning framework 1808 includes additional decommissioning replacement logic until the desired functionality of the legacy application has been introduced into the decommissioning framework 1808.

The decommissioner provides developers a tool to decommission and migrate legacy application functionality in a phased approach. The decommissioner identifies core web services that invoke legacy applications and defines, creates, and deploys a web service wrapper that provides control over the operation of the legacy application. As a result, the functionality of the legacy application may be migrated to a new platform and architecture, and the legacy application decommissioned so that organizations may continue to realize a return on their significant investment in the creation of the legacy application.

A number of implementations have been described. Nevertheless, it will be understood that various modifications may be made without departing from the spirit and scope of the invention. Accordingly, other implementations are within the scope of the following claims.

What is claimed is:

1. A method for decommissioning a legacy application, the method comprising:
   implementing a core web service that invokes legacy application logic implemented in a legacy application, the core web service comprising:
   a core web service identifier; and
   legacy application invocation logic operable to invoke the legacy application logic;
   identifying decommissioning replacement logic for a first part of the legacy application logic;
   establishing a decommissioning framework for the legacy application by:
   building a partially transitioned web service wrapper that comprises the core web service identifier and that invokes a combination of a second part of the legacy application logic and new application logic implemented in a new application;
   inserting the identified decommissioning replacement logic into the partially transitioned web service wrapper, the decommissioning replacement logic invoking new application logic implemented in the new application, and
   inserting legacy application invocation logic into the partially transitioned web service wrapper, the legacy application invocation logic invoking the second part of the legacy application logic;
   replacing the core web service with the partially transitioned web service wrapper included in the decommissioning framework;
   identifying additional decommissioning replacement logic for the second part of the legacy application logic; and
   building, in the decommissioning framework and using the additional decommissioning replacement logic, a fully transitioned web service wrapper that invokes new application logic implemented in the new application, but does not invoke the legacy application logic.

2. The method of claim 1, where the web service wrapper is one of multiple web service wrappers in the decommissioning framework, each comprising different decommissioning replacement logic for different legacy application logic in the legacy application.

3. The method of claim 2, further comprising:
   evaluating the decommissioning framework to determine a degree of coverage of desired functionality originally provided by the legacy application that is also provided by the decommissioning framework.

4. The method of claim 3, further comprising:
   comparing the degree of coverage against a decommissioning threshold; and issuing a decommissioning request to deactivate the legacy application when the degree of coverage exceeds the decommissioning threshold.

5. The method of claim 1, where inserting comprises:
   inserting an invocation of a replacement web service that replaces the legacy application logic.

6. The method of claim 1, where inserting comprises:
   inserting in-line executable logic that replaces the legacy application logic.

7. The method of claim 1, where establishing a decommissioning framework further comprises:
   adding a wrapper exception handler to the decommissioning framework.

8. A method for decommissioning a legacy application, the method comprising:
- determining a core web service identifier of a pre-existing web service for invoking legacy application logic;
- identifying decommissioning replacement logic for a first part of the legacy application logic;
- establishing a decommissioning framework for the legacy application by:
  - building a partially transitioned web service wrapper that comprises the core web service identifier and that invokes a combination of a second part of the legacy application logic and new application logic implemented in a new application;
  - inserting the identified decommissioning replacement logic into the partially transitioned web service wrapper, the decommissioning replacement logic invoking new application logic implemented in the new application, and
  - inserting legacy application invocation logic into the partially transitioned web service wrapper, the legacy application invocation logic invoking the second part of the legacy application logic;
- replacing the core web service with the partially transitioned web service wrapper included in the decommissioning framework;
- identifying additional decommissioning replacement logic for the second part of the legacy application logic; and
- building, in the decommissioning framework and using the additional decommissioning replacement logic, a fully transitioned web service wrapper that invokes new application logic implemented in the new application, but does not invoke the legacy application logic.

9. The method of claim 8, where the web service wrapper is one of multiple web service wrappers in the decommissioning framework, each comprising different decommissioning replacement logic for different legacy application logic in the legacy application.

10. The method of claim 9, further comprising:
- evaluating the decommissioning framework to determine a degree of coverage of desired functionality originally provided by the legacy application that is also provided by the decommissioning framework.

11. The method of claim 10, further comprising:
- comparing the degree of coverage against a decommissioning threshold; and
- issuing a decommissioning request to deactivate the legacy application when the degree of coverage exceeds the decommissioning threshold.

12. The method of claim 9, where inserting comprises:
- inserting an invocation of a replacement web service that replaces the legacy application logic.

13. The method of claim 9, where establishing comprises:
- establishing a decommissioning web service.

14. A computer system comprising:
- at least one processing device; and
- at least one computer-readable medium having computer-executable instructions that when executed, by the at least one processing device, cause the at least one processing device to perform operations comprising:
  - determining a core web service identifier of a pre-existing web service for invoking legacy application logic;
  - identifying decommissioning replacement logic for a first part of the legacy application logic;
  - establishing a decommissioning framework for the legacy application by:
    - building a partially transitioned web service wrapper that comprises the core web service identifier and that invokes a combination of a second part of the legacy application logic and new application logic implemented in a new application;
    - inserting the identified decommissioning replacement logic into the partially transitioned web service wrapper, the decommissioning replacement logic invoking new application logic implemented in the new application, and
    - inserting legacy application invocation logic into the partially transitioned web service wrapper, the legacy application invocation logic invoking the second part of the legacy application logic;
  - replacing the core web service with the partially transitioned web service wrapper included in the decommissioning framework;
  - identifying additional decommissioning replacement logic for the second part of the legacy application logic; and
  - building, in the decommissioning framework and using the additional decommissioning replacement logic, a fully transitioned web service wrapper that invokes new application logic implemented in the new application, but does not invoke the legacy application logic.

15. The system of claim 14, where the web service wrapper is one of multiple web service wrappers in the decommissioning framework, each comprising different decommissioning replacement logic for different legacy application logic in the legacy application.

16. The system of claim 15, wherein the operations further comprise:
- evaluating the decommissioning framework to determine a degree of coverage of desired functionality originally provided by the legacy application that is also provided by the decommissioning framework.

17. The system of claim 16, wherein the operations further comprise:
- comparing the degree of coverage against a decommissioning threshold; and
- issuing a decommissioning request to deactivate the legacy application when the degree of coverage exceeds the decommissioning threshold.

18. The system of claim 15, where inserting comprises:
- inserting an invocation of a replacement web service that replaces the legacy application logic.

19. The method of claim 15, where establishing comprises:
- establishing a decommissioning web service.

20. The system of claim 14, where establishing a decommissioning framework further comprises:
- adding a wrapper exception handler to the decommissioning framework.

* * * * *